United States Patent
Kim et al.

(10) Patent No.: US 12,353,786 B2
(45) Date of Patent: Jul. 8, 2025

(54) IMAGE DISPLAY APPARATUS AND IMAGE DISPLAY SYSTEM INCLUDING THE SAME

(71) Applicant: LG ELECTRONICS INC., Seoul (KR)

(72) Inventors: Sanghun Kim, Seoul (KR); Sijin Kim, Seoul (KR); Donghee Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/568,737

(22) PCT Filed: Jun. 10, 2021

(86) PCT No.: PCT/KR2021/007288
§ 371 (c)(1),
(2) Date: Dec. 8, 2023

(87) PCT Pub. No.: WO2022/260196
PCT Pub. Date: Dec. 15, 2022

(65) Prior Publication Data
US 2024/0272861 A1    Aug. 15, 2024

(51) Int. Cl.
*G06F 3/14* (2006.01)
*H04N 21/4363* (2011.01)

(52) U.S. Cl.
CPC .......... *G06F 3/1462* (2013.01); *G06F 3/1423* (2013.01); *H04N 21/43637* (2013.01)

(58) Field of Classification Search
CPC ...... G06F 9/451; G06F 3/0488; G06F 3/1454; G06F 3/0482; G06F 3/1462;
(Continued)

(56) References Cited

U.S. PATENT DOCUMENTS 11,360,634 B1 *   6/2022   Chang ................... G06F 3/0482
2011/0126130 A1 *  5/2011   Lieb ....................... G06F 3/1454
                                                      715/753
(Continued)

FOREIGN PATENT DOCUMENTS

KR   1020170013738   2/2017
KR   1020170081425   7/2017
(Continued)

OTHER PUBLICATIONS

PCT International Application No. PCT/KR2021/007288, International Search Report dated Mar. 2, 2022, 2 pages.
(Continued)

*Primary Examiner* — Md Saiful A Siddiqui
(74) *Attorney, Agent, or Firm* — LEE, HONG, DEGERMAN, KANG & WAIMEY

(57) ABSTRACT

The present disclosure relates to an image display apparatus and an image display system including the same. An image display apparatus according to one embodiment includes a display, a signal processing device to output an image signal, an interface to receive key data from a mobile terminal, and a memory to store the key data, in which the interface receives data related to a second image display apparatus from the mobile terminal, and in response to a mirroring input with the second image display, the signal processing device is configured to receive a mirroring image from the second image display apparatus or transmit a displayed image to the second image display apparatus, and in response to the mirroring image from the second image display apparatus, the signal processing device is configured to display the received mirroring image on the display. Therefore, it is possible to perform mirroring between a plurality of image display apparatuses.

19 Claims, 35 Drawing Sheets

(58) Field of Classification Search
CPC ............ G06F 3/1423; H04M 1/72439; H04M 2250/22; H04M 1/72406; H04M 1/72469; H04N 7/147; H04N 7/141; H04N 21/43637; H04N 21/4122; G09G 2370/16; G09G 2340/049

See application file for complete search history.

(56) References Cited

U.S. PATENT DOCUMENTS

| | | | |
|---|---|---|---|
| 2013/0254445 A1* | 9/2013 | Burns | H05K 5/0265 |
| | | | 710/301 |
| 2017/0060518 A1* | 3/2017 | Hong | G06F 3/0482 |
| 2017/0285788 A1 | 10/2017 | Park et al. | |
| 2017/0286047 A1* | 10/2017 | Patil | H04N 21/4122 |
| 2020/0117331 A1* | 4/2020 | Ye | G06F 3/0482 |
| 2020/0404491 A1 | 12/2020 | Sheng et al. | |
| 2021/0297748 A1* | 9/2021 | Gupta | H04N 21/43637 |

FOREIGN PATENT DOCUMENTS

| | | |
|---|---|---|
| KR | 1020170091303 | 8/2017 |
| KR | 1020170112747 | 10/2017 |
| KR | 102258052 | 5/2021 |

OTHER PUBLICATIONS

European Patent Office Application Serial No. 21945264.6, Search Report dated Feb. 27, 2025, 15 pages.

\* cited by examiner

IMAGE DISPLAY APPARATUS AND IMAGE DISPLAY SYSTEM INCLUDING THE SAME

CROSS-REFERENCE TO RELATED APPLICATION(S)

This application is the National Stage filing under 35 U.S.C. 371 of International Application No. PCT/KR2021/007288, filed on Jun. 10, 2021, the contents of which are all incorporated by reference herein in its entirety.

BACKGROUND

1. Field

The present disclosure relates to an image display apparatus and an image display system including the same, and more specifically, to an image display apparatus capable of performing mirroring between a plurality of image display apparatuses and an image display system including the same.

2. Description of the Related Art

An image display apparatus is a device that displays images.

Meanwhile, various images can be displayed through an image display apparatus, and in particular, it is possible to display mirroring images from nearby electronic devices.

Korean Patent No. 10-2008-0026954 (hereinafter referred to as "prior document") discloses a method of providing Bluetooth automatic registration in a mobile terminal.

According to the prior document, a method of registering Bluetooth devices with each other using automatic authentication information in a Bluetooth automatic registration mode is disclosed.

However, according to this prior document, there is a disadvantage in that it is impossible to transmit large amounts of video data due to the characteristics of Bluetooth after the Bluetooth automatic registration.

Therefore, according to the prior document, there is a disadvantage in that registration for a separate communication method other than Bluetooth is required to transmit video data.

SUMMARY

An object of the present disclosure is to provide an image display apparatus capable of performing mirroring between a plurality of image display apparatuses and an image display system including the same.

Meanwhile, another purpose of the present disclosure is to provide an image display apparatus that can easily perform mirroring between a plurality of image display apparatuses using an application on a mobile terminal and an image display system including the same.

According to an aspect of the present disclosure, there is provided an image display apparatus comprising: a display; a signal processing device configured to output an image signal to the display; an interface configured to receive key data received from a mobile terminal; and a memory configured to store the key data, in which the interface receives data related to a second image display apparatus from the mobile terminal, and in response to a mirroring input with the second image display apparatus being received, the signal processing device is configured to receive a mirroring image from the second image display apparatus or transmit a displayed image to the second image display apparatus, and in response to the mirroring image being received from the second image display apparatus, the signal processing device is configured to display the received mirroring image on the display.

In case in which key data stored in the second image display apparatus is the same as the key data stored in the memory, the signal processing device may complete pairing with the second image display apparatus.

A communication method for the pairing and a communication method for receiving the mirroring image may be different from each other.

In case in which an application for controlling an electronic device is executed in the mobile terminal, the key data may be transmitted from the mobile terminal.

In case in which second key data is received from a second mobile terminal via the interface, the memory may delete the key data and store the second key data.

In case in which the second image display apparatus is turned on in a state where an application for controlling an electronic device is executed in the mobile terminal, pairing between the mobile terminal and the second image display apparatus may be performed, after the pairing with the second image display apparatus is performed, the mobile terminal may transmit key data related to the application to the second image display apparatus, in case in which the image display apparatus is turned on in a state where the application for controlling the electronic device is executed in the mobile terminal, pairing between the mobile terminal and the image display apparatus may be performed, and after the pairing with the mobile terminal is performed, the interface may receive the key data related to the application from the image display apparatus.

In case in which the second image display apparatus is turned on after data related to the second image display apparatus is received from the mobile terminal, the interface may perform pairing with the second image display apparatus.

In case in which key data stored in the second image display apparatus is the same as key data stored in the memory during performing the pairing with the second image display apparatus, the interface may complete the pairing with the second image display apparatus, and in case in which the key data stored in the second image display apparatus is not the same as the key data stored in the memory, the interface may stop the pairing with the second image display apparatus.

In case in which the mirroring input with the second image display apparatus is received after the pairing with the second image display apparatus is completed, the interface may receive the mirroring image from the second image display apparatus or transmit the displayed image to the second image display apparatus, and in response to the mirroring image being received from the second image display apparatus, the signal processing device may be configured to display the received mirroring image on the display.

The signal processing device may be configured to display a setting screen including the key data according to a setting screen display input.

In response to a setting screen display input after key data received from the mobile terminal is received, the signal processing device may be configured to display a setting screen including the key data, and in response to a setting screen display input after second key data received from a second mobile terminal is received, the signal processing device may be configured to display a setting screen including the second key data.

In case in which a mirroring input with the second image display is received during displaying a first image on the display, the signal processing device may be configured to display the first image and the mirroring image together.

In case in which in case in which the mirroring input with the second image display apparatus is received during displaying a first image on the display, the signal processing device may be configured to make the first image disappear and display only the mirroring image.

The interface may receive data related to a third image display apparatus from the mobile terminal, and may receive a second mirroring image from the third image display apparatus or transmit a displayed image to the third image display apparatus in case in which a mirroring input with the third image display apparatus is received, and in case in which the second mirroring image is received from the third image display apparatus, the signal processing device may be configured to display the received second mirroring image on the display.

In case in which the second mirroring image is received from the third image display apparatus in a state where the mirroring image is received from the second image display apparatus, the signal processing device may be configured to display the mirroring image and the second mirroring image together.

In case in which key data stored in the third image display apparatus is the same as key data stored in the memory in a state of pairing with the second image display apparatus, the interface may complete the pairing with the second image display apparatus.

In case in which the interface pairs with the second image display apparatus and the third image display apparatus, the second image display apparatus and the third image display apparatus may perform the pairing.

According to another aspect of the present disclosure, there is provided an image display system including: an image display apparatus; and a second image display apparatus spaced apart from the image display apparatus.

The image display system may further include a mobile terminal configured to transmit the same key data to each of the image display apparatus and the second image display apparatus in case in which the image display apparatus and the second image display apparatus are turned on in a state where an application for controlling the second image display apparatus of the image display apparatus is executed.

The image display apparatus and the second image display apparatus may perform pairing in case in which the same key data as each other is stored, and in response to the mirroring image being received from the second image display apparatus, the image display apparatus may display the received mirroring image.

EFFECTS OF THE DISCLOSURE

According to an aspect of the present disclosure, there is provided the image display apparatus comprising: the display; the signal processing device configured to output the image signal to the display; the interface configured to receive the key data received from the mobile terminal; and the memory configured to store the key data, in which the interface receives the data related to the second image display apparatus from the mobile terminal, and in case in which the mirroring input with the second image display apparatus is received, the signal processing device receives the mirroring image from the second image display apparatus or transmits the displayed image to the second image display apparatus, and in response to the mirroring image being received from the second image display apparatus, the signal processing device is configured to display the received mirroring image on the display. Accordingly, the mirroring can be easily performed between a plurality of image display apparatuses. In particular, the mirroring can be easily performed between a plurality of image display apparatuses using the application of the mobile terminal.

In case in which the key data stored in the second image display apparatus is the same as the key data stored in the memory, the signal processing device may complete pairing with the second image display apparatus. Accordingly, the pairing can be easily performed using the key data.

The communication method for the pairing and the communication method for receiving the mirroring image may be different from each other. Accordingly, it is possible to receive large amounts of data in case in which receiving the mirroring image.

In case in which the application for controlling an electronic device is executed in the mobile terminal, the key data may be transmitted from the mobile terminal. Accordingly, the mirroring can be easily performed between the plurality of image display apparatuses using the application of the mobile terminal.

In case in which the second key data is received from the second mobile terminal via the interface, the memory may delete the key data and store the second key data. Accordingly, in case in which the key data of the image display apparatus and the key data of the second image display apparatus are different from each other, the mirroring cannot be performed, and the mirroring is performed only in case in which the key data of the image display apparatus and the key data of the second image display apparatus are the same as each other.

In case in which the second image display apparatus is turned on in a state where the application for controlling the electronic device is executed in the mobile terminal, the pairing between the mobile terminal and the second image display apparatus may be performed, after the pairing with the second image display apparatus is performed, the mobile terminal may transmit the key data related to the application to the second image display apparatus, in case in which the image display apparatus is turned on in a state where the application for controlling the electronic device is executed in the mobile terminal, the pairing between the mobile terminal and the image display apparatus may be performed, and after the pairing with the mobile terminal is performed, the interface may receive the key data related to the application from the image display apparatus. Accordingly, the mirroring can be easily performed between the plurality of image display apparatuses using the application of the mobile terminal.

In case in which the second image display apparatus is turned on after the data related to the second image display apparatus is received from the mobile terminal, the interface may perform pairing with the second image display apparatus. Accordingly, the mirroring can be easily performed between the plurality of image display apparatuses using the application of the mobile terminal.

In case in which the key data stored in the second image display apparatus is the same as the key data stored in the memory during performing the pairing with the second image display apparatus, the interface may complete the pairing with the second image display apparatus, and in case in which the key data stored in the second image display apparatus is not the same as the key data stored in the memory, the interface may stop the pairing with the second image display apparatus. Accordingly, in case in which the key data of the image display apparatus and the key data of the second image display apparatus are different from each other, the mirroring cannot be performed, and the mirroring is performed only in case in which the key data of the image display apparatus and the key data of the second image display apparatus are the same as each other.

In case in which the mirroring input with the second image display apparatus is received after the pairing with the second image display apparatus is completed, the interface may receive the mirroring image from the second image display apparatus or transmit the displayed image to the second image display apparatus, and in response to the mirroring image being received from the second image display apparatus, the signal processing device may be configured to display the received mirroring image on the display. Accordingly, the mirroring can be easily performed between the plurality of image display apparatuses using the application of the mobile terminal.

The signal processing device may be configured to display the setting screen including the key data according to the setting screen display input. Accordingly, the key data can be easily confirmed.

In case in which there is the setting screen display input after the key data received from the mobile terminal is received, the signal processing device may be configured to display the setting screen including the key data, and in case in which there is the setting screen display input after the second key data received from the second mobile terminal is received, the signal processing device may be configured to display the setting screen including the second key data. Accordingly, the stored key data can be easily confirmed.

In case in which the mirroring input with the second image display is received during displaying the first image on the display, the signal processing device may be configured to display the first image and the mirroring image together. Accordingly, it is possible to display the mirroring image together during displaying the first image.

In case in which the mirroring input with the second image display apparatus is received during displaying the first image on the display, the signal processing device may be configured to make the first image disappear and display only the mirroring image. Accordingly, only the mirroring image can be displayed.

The interface may receive the data related to the third image display apparatus from the mobile terminal, and may receive the second mirroring image from the third image display apparatus or transmit the displayed image to the third image display apparatus in case in which the mirroring input with the third image display apparatus is received, and in case in which the second mirroring image is received from the third image display apparatus, the signal processing device may be configured to display the received second mirroring image on the display. Accordingly, it is possible to display the second mirroring image from the third image display apparatus.

In case in which the second mirroring image is received from the third image display apparatus in a state where the mirroring image is received from the second image display apparatus, the signal processing device may be configured to display the mirroring image and the second mirroring image together. Accordingly, it is possible to display the second mirroring image together with another image during displaying the mirroring image.

In case in which the key data stored in the third image display apparatus is the same as the key data stored in the memory in a state of pairing with the second image display apparatus, the interface may complete the pairing with the second image display apparatus. Accordingly, the mirroring can be easily performed between the plurality of image display apparatuses using the application of the mobile terminal.

In case in which the interface pairs with the second image display apparatus and the third image display apparatus, the second image display apparatus and the third image display apparatus may perform the pairing. Accordingly, the mirroring can be easily performed between the plurality of image display apparatuses using the application of the mobile terminal.

According to another aspect of the present disclosure, there is provided the image display system including: the image display apparatus; and the second image display apparatus spaced apart from the image display apparatus. Accordingly, the mirroring can be easily performed between the plurality of image display apparatuses using the application of the mobile terminal.

The image display system may further include the mobile terminal configured to transmit the same key data to each of the image display apparatus and the second image display apparatus in case in which the image display apparatus and the second image display apparatus are turned on in a state where the application for controlling the second image display apparatus of the image display apparatus is executed. Accordingly, the mirroring can be easily performed between the plurality of image display apparatuses using the application of the mobile terminal.

The image display apparatus and the second image display apparatus may perform pairing in case in which the same key data as each other is stored, and in response to the mirroring image being received from the second image display apparatus, the image display apparatus may display the received mirroring image. Accordingly, the mirroring can be easily performed between the plurality of image display apparatuses using the application of the mobile terminal.

DETAILED DESCRIPTION OF THE PREFERRED EMBODIMENTS

Hereinafter, the present disclosure will be described in detail with reference to the accompanying drawings.

As used herein, the suffixes "module" and "unit" are added to simply facilitate preparation of this specification and are not intended to suggest special meanings or functions. Therefore, the suffixes "module" and "unit" may be used interchangeably.

Figure 1:
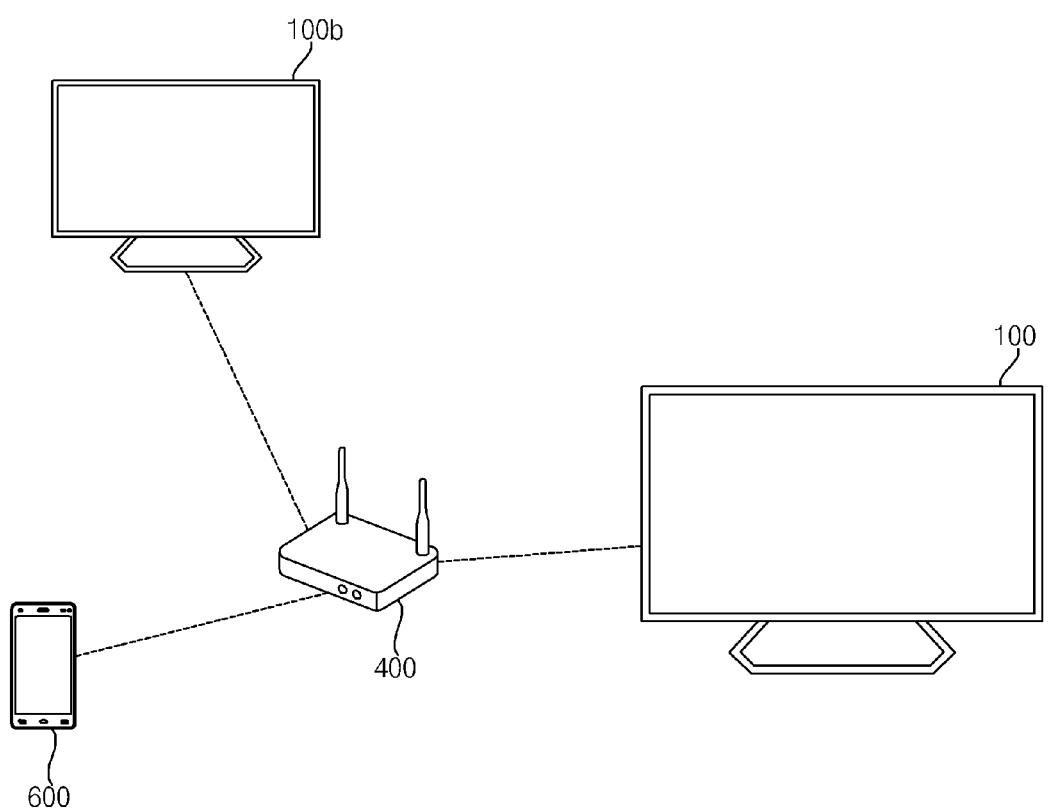
FIG. 1 is a diagram illustrating an image display system of one embodiment of the present disclosure.

FIG. 1 is a diagram illustrating an image display system according to one embodiment of the present disclosure.

Referring to the drawings, an image display system 10 according to one embodiment of the present disclosure may include a plurality of image display apparatuses 100 and 100b and a mobile terminal 600.

Additionally, the image display system 10 may further include an AP device 400 that provides a wireless network.

Among the plurality of image display apparatuses 100 and 100b, the image display apparatus 100 and the second image display apparatus 100b may be arranged to be spaced apart from each other.

The image display system 10 according to one embodiment of the present disclosure uses an application for controlling an electronic device in the mobile terminal 600 for easy mirroring between the plurality of image display apparatuses 100 and 100b.

Specifically, in case in which the application for controlling the electronic device is executed in the mobile terminal 600, the same key data may be transmitted to the plurality of image display apparatuses 100 and 100b, respectively, and the plurality of image display apparatuses 100 and 100b store the key data.

In addition, the plurality of image display apparatuses 100 and 100b compare the key data with each other, and in case in which the key data is the same as each other, wireless pairing is performed automatically. Accordingly, the wireless pairing can be easily performed.

In particular, wireless pairing is automatically performed between the plurality of image display apparatuses 100 and 100b without separate input or manipulation from the plurality of image display apparatuses 100 and 100b.

Meanwhile, after the wireless pairing between the plurality of image display apparatuses 100 and 100b, in response to mirroring input, the mirroring is performed automatically.

For example, during displaying a predetermined image in the image display apparatus 100, wireless pairing is performed with the second image display apparatus 100b, and after the wireless pairing, in response to the mirroring input, the image display apparatus 100 receives the mirroring image from the second image display apparatus 100b, or transmits the displayed image to the second image display apparatus 100b.

In particular, in case in which receiving the mirroring image from the second image display apparatus 100b, the image display apparatus 100 displays the mirroring image via the display 180. Accordingly, the mirroring can be easily performed between the plurality of image display apparatuses 100. In particular, the mirroring can be easily performed between the plurality of image display apparatuses 100 using the application of the mobile terminal 600.

Meanwhile, the image display apparatus 100 and the second image display apparatus 100b of FIG. 1 may be a TV, a monitor, a tablet PC, or a vehicle display device.

Figure 2:
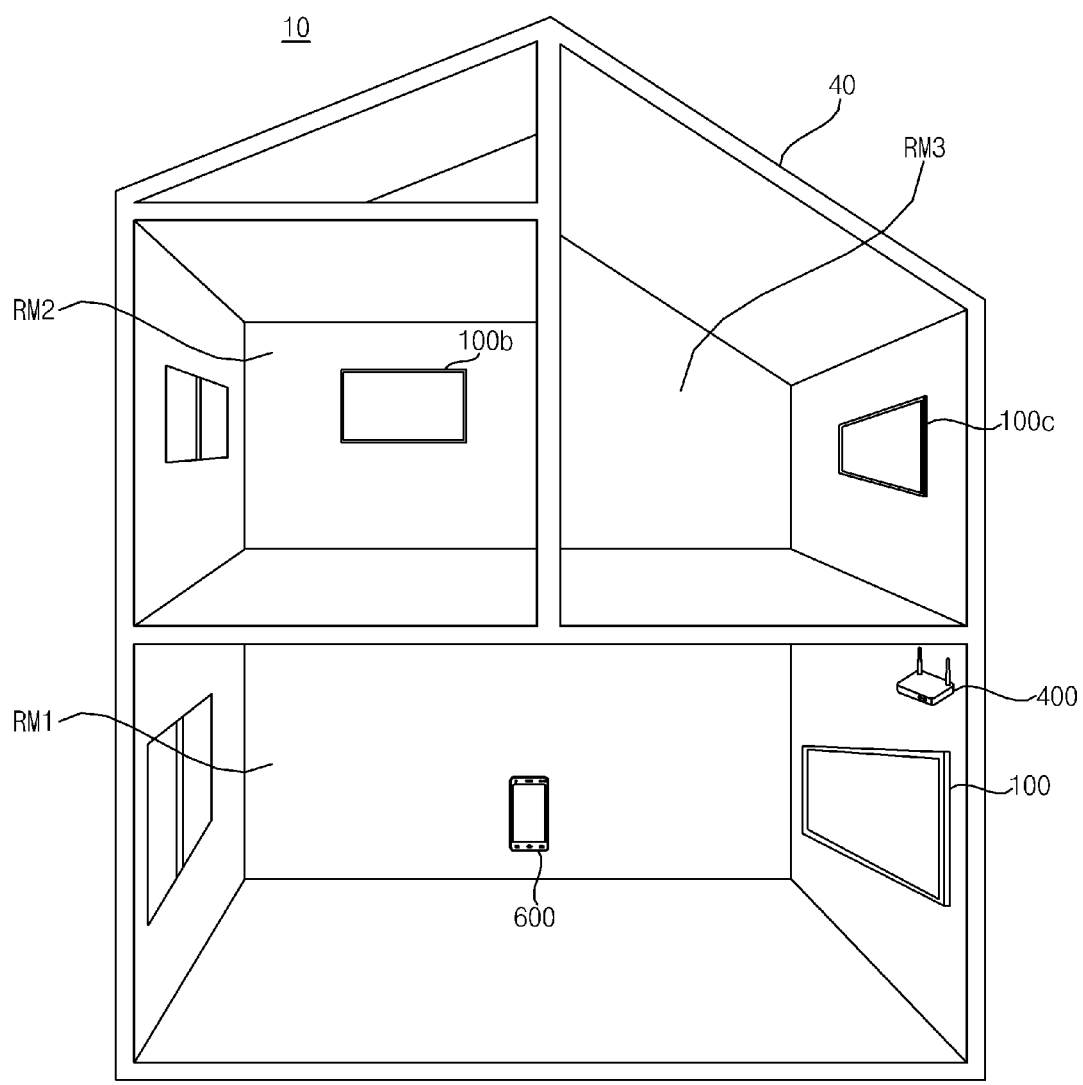
FIG. 2 is a layout diagram of a plurality of image display apparatuses in the image display system of FIG. 1.

FIG. 2 is a layout diagram of the plurality of image display apparatuses in the image display system of FIG. 1.

Referring to the drawings, the image display system 10 according to one embodiment of the present disclosure may include the plurality of image display apparatuses 100, 100b, and 100c and the mobile terminal 600. Moreover, the image display system 10 may further include an AP device 400.

In the drawing, the image display apparatus 100 is disposed in a first space RM1, the second image display apparatus 100b is disposed in a second space RM2, and the third image display apparatus 100b is disposed in the third space RM3.

In case in which the plurality of image display apparatuses 100, 100b, and 100c are located in different spaces, it is difficult to perform wireless pairing or mirroring.

For this purpose, the AP device 400 can be used to provide the same wireless network.

For example, the AP device 400 may provide the same WiFi-based wireless network.

Meanwhile, in case in which the application for controlling the electronic device is executed in the mobile terminal 600, the same key data may be transmitted to the plurality of image display apparatuses 100, 100b, and 100c, respectively, and the plurality of image display apparatuses 100, 100b, and 100c stores the key data.

Meanwhile, the mobile terminal 600 may perform wireless pairing with each of the image display apparatuses 100, 100b, and 100c in order to transmit the key data to the plurality of image display apparatuses 100, 100b, and 100c. Moreover, after the wireless pairing, the same key data can be transmitted to each of the image display apparatuses 100, 100b, and 100c.

The plurality of image display apparatuses 100, 100b, and 100c compare the key data with each other and, in case in which the key data is the same as each other, the wireless pairing is performed automatically. Accordingly, the wireless pairing can be easily performed.

In particular, the wireless pairing is automatically performed between the plurality of image display apparatuses 100, 100b, and 100c without any separate input or manipulation in the plurality of image display apparatuses 100, 100b, and 100c.

Meanwhile, after the wireless pairing between the plurality of image display apparatuses 100, 100b, and 100c, in response to the mirroring input, the mirroring is performed automatically.

For example, during displaying a predetermined image in the image display apparatus 100, in case in which the wireless pairing with the second image display apparatus 100b is performed and there is the mirroring input after the wireless pairing, the image display apparatus 100 receives the mirroring image from the second image display 100b, or transmits the displayed image to the second image display apparatus 100b.

In particular, in case in which receiving the mirroring image from the second image display apparatus 100b, the image display apparatus 100 displays the mirroring image through the display 180. Accordingly, the mirroring can be easily performed between the plurality of image display apparatuses 100. In particular, the mirroring can be easily performed between the plurality of image display apparatuses 100 using the application on the mobile terminal 600.

As another example, in case in which wireless pairing is performed between the second image display apparatus 100*b* and the third image display apparatus 100*c* during displaying a predetermined image in the image display apparatus 100 and there is the mirroring input after the wireless pairing, the display apparatus 100 may receive the mirroring image from each of the second image display apparatus 100*b* and the third image display apparatus 100*c*.

Accordingly, the image display apparatus 100 may display the received mirroring images together on the display 180.

Meanwhile, a communication method during the wireless pairing between the mobile terminal 600 and the plurality of image display apparatuses 100, 100*b*, and 100*c* may be different from a communication method during the wireless pairing between the plurality of image display apparatuses 100, 100*b*, and 100*c*.

Specifically, in order to transmit key data from the mobile terminal 600 to the plurality of image display apparatuses 100, 100*b*, 100*c*, the mobile terminal 600 may be wirelessly paired with each of the image display apparatus 100, 100*b*, 100*c*, and in this case, the wireless communication method may be a BLUETOOTH communication method.

Meanwhile, the wireless pairing may be performed between the plurality of image display apparatuses 100, 100*b*, and 100*c*, and in this case, the wireless communication method may be a WiFi communication method.

Meanwhile, the communication method for transmitting the mirroring images between the plurality of image display apparatuses 100, 100*b*, and 100*c* may be a WiFi communication method.

Alternatively, since the communication method for transmitting the mirroring images between the plurality of image display apparatuses 100, 100*b*, 100*c* requires transmitting large amounts of video data, the communication method may be different from a communication method such as Direct WiFi or WiGig different from the communication method of the wireless pairing between the plurality of image display apparatuses 100, 100*b*, and 100*c*.

Figure 3:
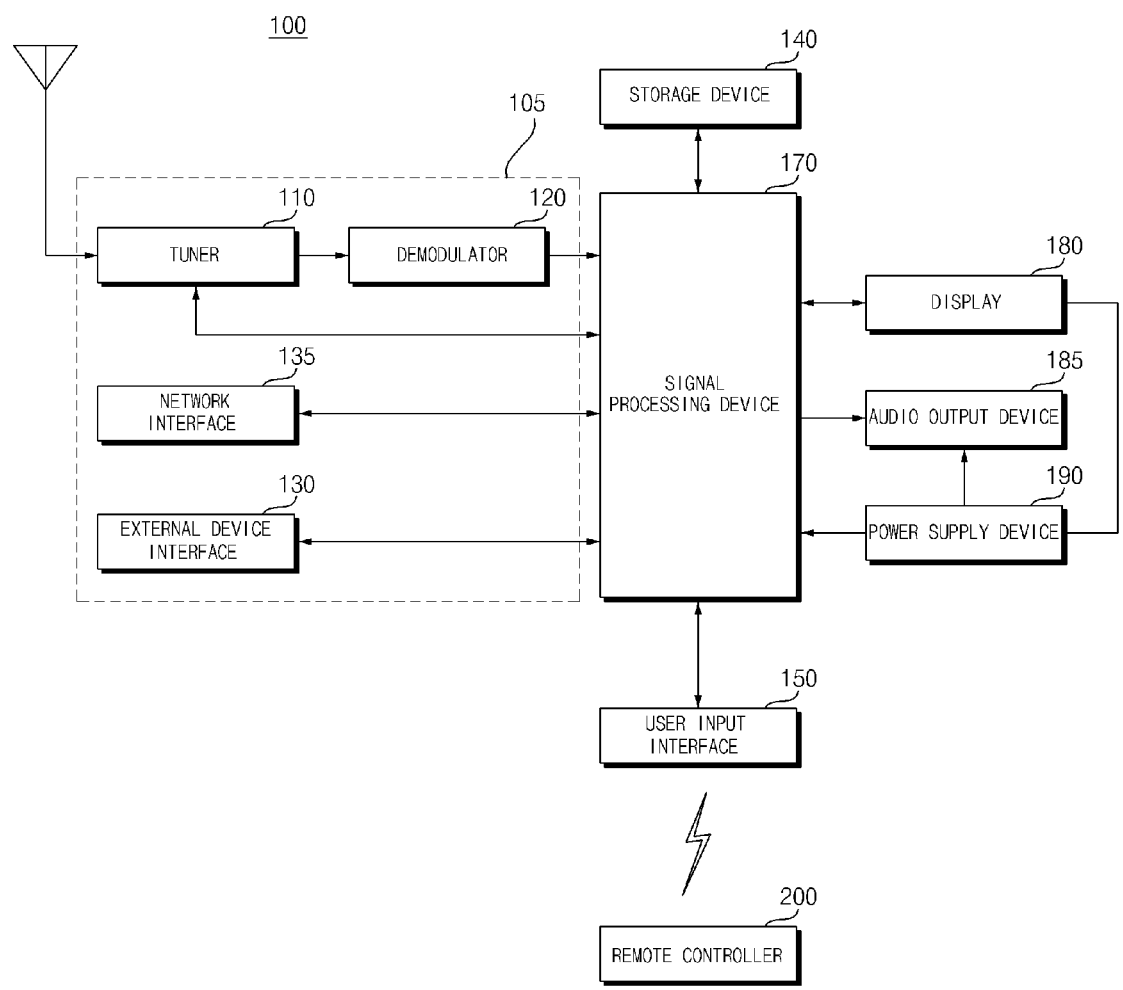
FIG. 3 is an internal block diagram illustrating an image display apparatus of FIG. 1.

FIG. 3 is an internal block diagram illustrating the image display apparatus of FIG. 1.

Referring to FIG. 3, the image display apparatus 100 according to one embodiment of the present disclosure may include an image receiver 105, an external device interface 130, a network interface 135, a storage device 140, a user input interface 150, a sensor device (not illustrated), a signal processing device 170, a display 180, and an audio output device 185.

The image receiver 105 may receive an input image. For example, the image receiver 105 may receive a broadcast image, an HDMI image, or an external input image such as a streamed image.

The image receiver 105 may include a tuner 110, a demodulator 120, a network interface 135, and an external device interface 130.

Meanwhile, unlike the drawings, the image receiver 105 may include only the tuner 110, the demodulator 120, and the external device interface 130. That is, the image receiver 105 may not include the network interface 135.

The tuner 110 selects a channel selected by a user from among radio frequency (RF) broadcast signals received through an antenna (not illustrated) or an RF broadcast signal corresponding to all pre-stored channels. In addition, the tuner 110 converts the selected RF broadcast signal into a middle-frequency signal, a baseband image, or a voice signal.

To receive broadcast signals of a plurality of channels, a plurality of tuners 110 may be provided. Alternatively, a single tuner to receive a plurality of channels simultaneously may be provided.

The demodulator 120 receives and demodulates a digital IF (DIF) signal converted by the tuner 110.

After performing demodulation and channel decoding, the demodulator 120 may output a stream signal (TS). Herein, the stream signal may be a signal obtained by multiplexing an image signal, voice signal or data signal.

The stream signal output from the demodulator 120 may be input to the signal processing device 170. After performing demultiplexing and image/voice signal processing, the signal processing device 170 outputs an image to the display 180 and voice to the audio output device 185.

The external device interface 130 may transmit or receive data to or from a connected external device (not illustrated), for example, a set-top box 50.

To this end, the external device interface 130 may include an A/V input/output device (not illustrated), a wireless transceiver (not illustrated), and the like.

The external device interface 130 may be connected to external devices such as a digital versatile disc (DVD) player, a Blu-ray player, a gaming device, a camera, a camcorder, a computer (laptop), and a set-top box in a wired/wireless manner, and perform input/output operations with external devices.

The A/V input/output device in the external device interface 130 may receive the image and voice signal of the external device. Meanwhile, the wireless transceiver (not illustrated) in the external device interface 130 may perform short-range wireless communication with other electronic devices.

The external device interface 130 may exchange data with a neighboring mobile terminal 600 via the wireless transceiver (not illustrated). In particular, in the mirroring mode, the external device interface 130 may receive device information, information about an executed application and an application image from the mobile terminal 600.

The network interface 135 provides an interface for connecting the image display apparatus 100 to a wired/wireless network including the Internet. For example, the network interface 135 may receive content or data provided by the Internet or a content provider or network operator through a network.

The network interface 135 may include a wireless transceiver (not illustrated).

The storage device 140 may store programs for processing and control of signals in the signal processing device 170, and also store a signal-processed image, voice signal or data signal.

The storage device 140 may function to temporarily store an image signal, a voice signal, or a data signal input through the external device interface 130. In addition, the storage device 140 may store information about a predetermined broadcast channel through the channel memorization function such as a channel map.

While it is illustrated in FIG. 3 that the storage device 140 is provided separately from the signal processing device 170, embodiments of the present disclosure are not limited thereto. The storage device 140 may be included in the signal processing device 170.

The user input interface 150 may transmit a signal input by the user to the signal processing device 170 or transmit a signal from the signal processing device 170 to the user.

For example, the user input interface 150 may transmit/receive user input signals such as power on/off, channel selection, and screen setting to/from the remote controller 200, deliver user input signals input through local keys (not illustrated) such as a power key, a channel key, a volume key, or a setting key, deliver user input signals input through a sensor device (not illustrated) to sense user gestures to the signal processing device 170, or transmit a signal from the signal processing device 170 to the sensor device (not illustrated).

The signal processing device 170 may demultiplex streams input through the tuner 110, demodulator 120, network interface 135, or external device interface 130, or process demultiplexed signals. Thereby, the signal processing device 170 may generate an output signal for outputting an image or voice.

For example, the signal processing device 170 may receive a broadcast signal or HDMI signal received from the image receiver 105, perform signal processing based on the received broadcast signal or HDMI signal, and output the signal-processed image signal.

An image signal image-processed by the signal processing device 170 may be input to the display 180 and an image corresponding to the image signal may be displayed. In addition, the image signal which is image-processed by the signal processing device 170 may be input to an external output device through the external device interface 130.

A voice signal processed by the signal processing device 170 may be output to the audio output device 185 in the form of sound. In addition, the voice signal processed by the signal processing device 170 may be input to an external output device through the external device interface 130.

Although not illustrated in FIG. 3, the signal processing device 170 may include a demultiplexer, an image processor, and the like. That is, the signal processing device 170 may perform various signal processing, and thus may be implemented in the form of a System On Chip (SOC). This will be described later with reference to FIG. 4.

Additionally, the signal processing device 170 may control overall operation of the image display apparatus 100. For example, the signal processing device 170 may control the tuner 110 to tune to an RF broadcast corresponding to a channel selected by the user or a pre-stored channel.

The signal processing device 170 may control the image display apparatus 100 according to a user command input through the user input interface 150 or an internal program.

The signal processing device 170 may control the display 180 to display an image. Herein, the image displayed on the display 180 may be a still image, a moving image, a 2D image, or a 3D image.

The signal processing device 170 may be configured to display the predetermined object in an image displayed on the display 180. For example, the object may be at least one of an accessed web page (a newspaper, a magazine, or the like), electronic program guide (EPG), various menus, a widget, an icon, a still image, a moving image, or text.

The signal processing device 170 may recognize the location of the user based on an image captured by a capture device (not illustrated). For example, the signal processing device 170 may recognize a distance (a z-axis coordinate) between the user and the image display apparatus 100. Additionally, the signal processing device 170 may recognize an x-axis coordinate and a y-axis coordinate corresponding to the location of the user in the display 180.

The display 180 generates drive signals by converting an image signal, data signal, OSD signal, and control signal processed by the signal processing device 170 or an image signal, data signal, and control signal received from the external device interface 130.

The display 180 may be configured as a touch screen and used as an input device in addition to an output device.

The audio output device 185 receives a voice signal processed by the signal processing device 170 and outputs voice.

The capture device (not illustrated) captures the user. The capture device (not illustrated) may be implemented with one camera, but is not limited thereto, and may be implemented with a plurality of cameras. Image information captured by the capture device (not illustrated) may be input to the signal processing device 170.

The signal processing device 170 may sense user gestures based on an image captured by the capture device (not illustrated), a sensed signal from the sensor device (not illustrated), or a combination thereof.

The signal processing device 170 may be implemented in the form of a System On Chip (SOC).

The power supply 190 supplies corresponding power throughout the image display apparatus 100. In particular, the power supply 190 may supply power to the signal processing device 170 implemented in the form of a System On Chip (SOC), the display 180 for displaying images, an audio output device 185 for outputting audio, or the like.

Specifically, the power supply 190 may include a converter to convert alternating current (AC) power into direct current (DC) power and a DC-DC converter to change the level of the DC power.

The remote controller 200 transmits user input to the user input interface 150. To this end, the remote controller 200 may employ Bluetooth, radio frequency (RF) communication, infrared (IR) communication, ultra-wideband (UWB), or ZigBee. In addition, the remote controller 200 may receive an image signal, a voice signal, or a data signal output from the user input interface 150, and display the signals on the remote controller 200 or voice-output.

The image display apparatus 100 may be a fixed or mobile digital broadcast receiver capable of receiving digital broadcast services.

The block diagram of the image display apparatus 100 illustrated in FIG. 3 is a block diagram for one embodiment of the present disclosure. Constituents of the block diagram may be integrated, added or omitted according to the specifications of the image display apparatus 100 which is implemented in reality. That is, two or more constituents may be combined into one constituent, or one constituent may be subdivided into two or more constituents, in case in which necessary. In addition, the function performed in each block is simply illustrative, and it should be noted that specific operations or devices of the blocks do not limit the scope of the present disclosure.

Figure 4:
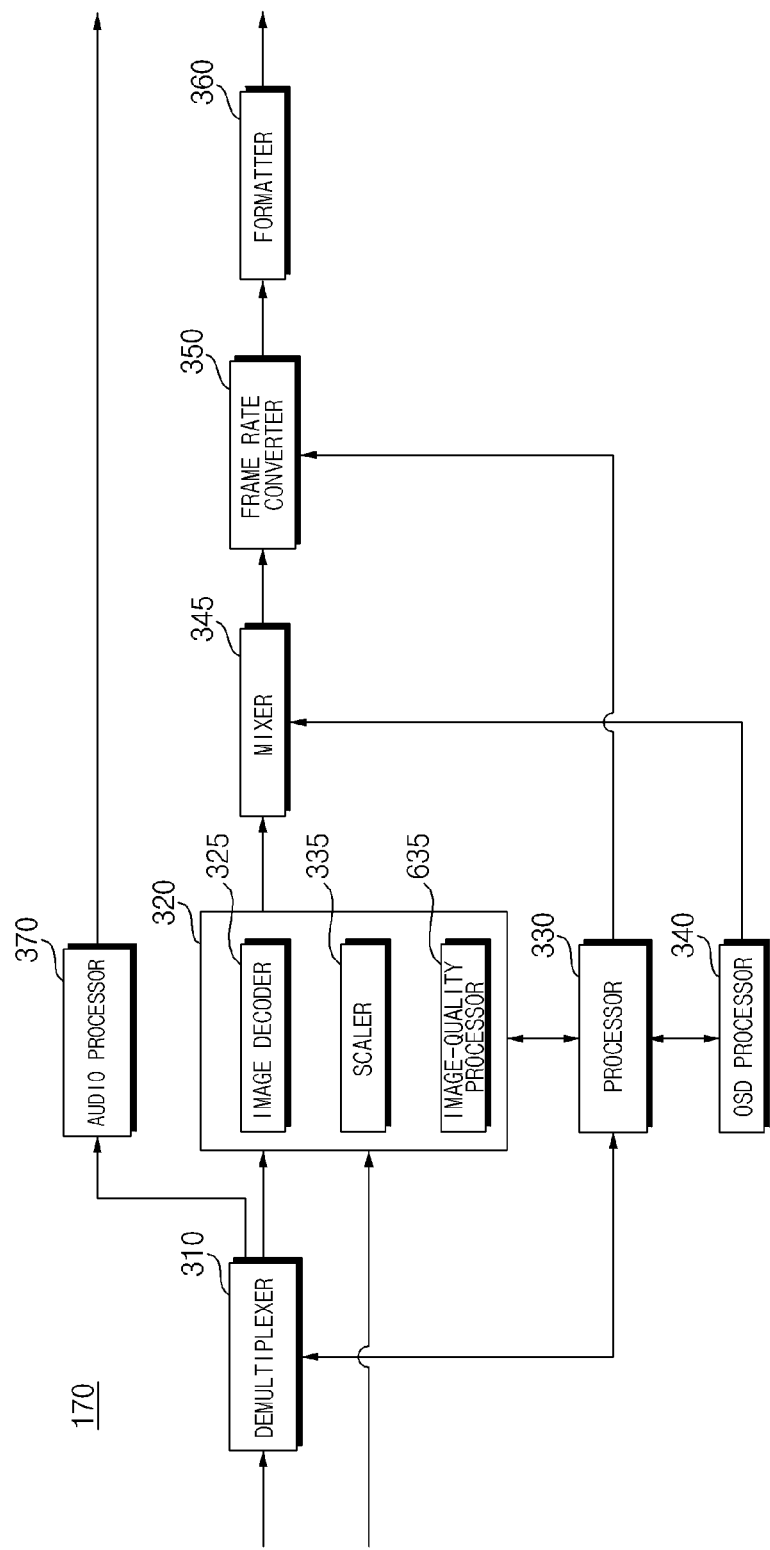
FIG. 4 is an internal block diagram illustrating a signal processing device of FIG. 3.

FIG. 4 is an internal block diagram illustrating the signal processing device of FIG. 3.

Referring to the drawings, the signal processing device 170 according to one embodiment of the present disclosure may include a demultiplexer 310, an image processor 320, a processor 330, and an audio processor 370. In addition, the signal processing device 170 may further include a data processor (not illustrated).

The demultiplexer 310 demultiplexes an input stream. For example, in case in which an MPEG-2 TS is input, the demultiplexer 310 may demultiplex the MPEG-2 TS to separate the MPEG-2 TS into an image signal, a voice signal and a data signal. Herein, the stream signal input to the demultiplexer 310 may be a stream signal output from the tuner 110, the demodulator 120 or the external device interface 130.

The image processor 320 may perform signal processing on an input image. For example, the image processor 320 may perform image processing of an image signal demultiplexed by the demultiplexer 310.

To this end, the image processor 320 includes an image decoder 325, a scaler 335, an image-quality processor 635, an image encoder (not illustrated), an OSD processor 340, a frame rate converter 350, and a formatter 360, and the like.

The image decoder 325 decodes the demultiplexed image signal, and the scaler 335 scales the resolution of the decoded image signal such that the image signal can be output through the display 180.

The image decoder 325 may include decoders of various standards. For example, the image decoder 325 may include an MPEG-2 decoder, an H.264 decoder, a 3D image decoder for color images and depth images, and a decoder for multi-viewpoint images.

The scaler 335 may scale an input image signal that has been image decoded by the image decoder 325 or the like.

For example, the scaler 335 may perform up-scaling in case in which the size or resolution of the input image signal is small, and down-scaling in case in which the size or resolution of the input image signal is large.

The image-quality processor 635 may perform image quality processing on an input image signal that has been image decoded in the image decoder 325 or the like.

For example, the image-quality processor 635 may perform noise removal processing of the input image signal, expand the resolution of gray levels of an input image signal, improve image resolution, perform high dynamic range (HDR) based signal processing, change the frame rate, or perform image quality processing corresponding to panel characteristics, particularly organic light emitting panels or the like.

The OSD processor 340 generates an OSD signal automatically or according to user input. For example, the OSD processor 340 may generate a signal for display of various kinds of information in the form of images or text on the screen of the display 180 based on a user input signal. The generated OSD signal may include various data including the user interface screen window of the image display apparatus 100, various menu screen windows, widgets, and icons. The generated OSD signal may also include a 2D object or a 3D object.

The OSD processor 340 may generate a pointer which can be displayed on the display, based on a pointing signal input from the remote controller 200. In particular, the pointer may be generated by a pointing signal processing device (not illustrated), and the OSD processor 340 may include the pointing signal processing device. Of course, the pointing signal processing device (not illustrated) is not provided in the OSD processor 340 and may be separately from the OSD processor 340.

The frame rate converter (FRC) 350 may convert the frame rate of an input image. The FRC 350 may output frames without performing separate frame rate conversion.

The formatter 360 may change the format of an input image signal into an image signal for display on a display and output the changed image signal.

In particular, the formatter 360 may change the format of the image signal to correspond to the display panel.

Meanwhile, the formatter 360 may change the format of an image signal. For example, the format of the 3D image signal may be changed to any one format of various 3D formats such as a Side by Side format, a Top/Down format, a Frame Sequential format, an Interlaced format, a Checker Box format.

The processor 330 may control overall operations within the image display apparatus 100 or signal processing device 170.

For example, the processor 330 may control the tuner 110 to select (tuning) an RF broadcast corresponding to a channel selected by a user or a pre-stored channel.

The processor 330 may control the image display apparatus 100 according to a user command input through the user input interface 150 or an internal program.

The processor 330 may perform data transfer control with the network interface 135 or the external device interface 130.

The processor 330 may control operations of the demultiplexer 310 and the image processor 320 within the signal processing device 170.

The audio processor 370 in the signal processing device 170 may voice-process a demultiplexed voice signal. To this end, the audio processor 370 may include various decoders.

The audio processor 370 in the signal processing device 170 may perform processing such as adjustment of bass, treble, and volume.

The data processor (not illustrated) in the signal processing device 170 may perform data processing on a demultiplexed data signal. For example, in case in which the demultiplexed data signal is a coded data signal, the data processor (not illustrated) may decode the data signal. The coded data signal may be electronic program guide information including broadcast information such as a start time and end time of a broadcast program broadcast on each channel.

The block diagram of the signal processing device 170 illustrated in FIG. 4 is a block diagram for one embodiment of the present disclosure. Constituents of the block diagram may be integrated, added, or omitted according to the specifications of the signal processing device 170 which is implemented in reality.

In particular, the frame rate converter 350 and the formatter 360 may be separately provided in addition to the image processor 320.

Figure 5A:
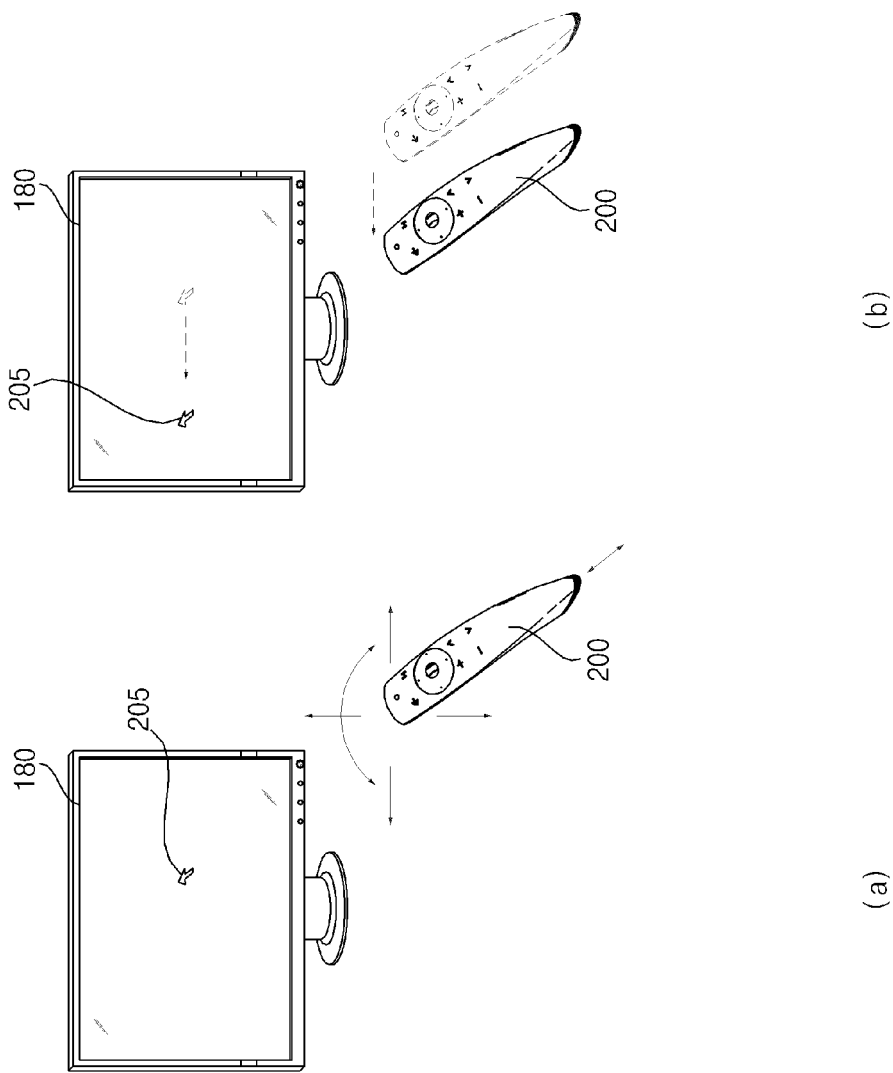
FIG. 5A illustrates a method for controlling a remote controller of FIG. 3.

FIG. 5A illustrates a method for controlling the remote controller of FIG. 3.

As illustrated in FIG. 5A(a), a pointer 205 corresponding to the remote controller 200 may be displayed on the display 180.

The user may move the remote controller 200 up and down, left and right (FIG. 5A(b)), or back and forth (FIG. 5A(c)) or rotate the same. The pointer 205 displayed on the display 180 of the image display apparatus corresponds to movement of the remote controller 200. As illustrated in the drawings, since the pointer 205 moves according to movement of the remote controller 200 in the 3D space, the remote controller 200 may be referred to as a spatial remote control or a 3D pointing device.

FIG. 5A(b) illustrates a case where the pointer 205 displayed on the display 180 of the image display apparatus moves to the left in case in which the user moves the remote controller 200 to the left.

Information about movement of the remote controller 200 sensed through a sensor of the remote controller 200 is transmitted to the image display apparatus. The image display apparatus may calculate coordinates of the pointer 205 based on the information about the movement of the remote controller 200. The image display apparatus may display the pointer 205 such that the pointer 205 corresponds to the calculated coordinates.

FIG. 5A(c) illustrates a case where the user moves the signal processing device 170 away from display 180 in a state where the user presses down a specific button in the remote controller 200. In this case, a selected area on the display 180 corresponding to the pointer 205 may be zoomed in and displayed with the size thereof increased. On the other hand, in case in which the user moves the remote controller 200 closer to the display 180, the selected area in the display 180 corresponding to the pointer 205 may be zoomed out and displayed with the size thereof reduced. Alternatively, the selected area may be zoomed out in case in which the remote controller 200 moves away from the display 180, and may be zoomed in in case in which the remote controller 200 moves closer to the display 180.

Vertical and lateral movement of the remote controller 200 may not be recognized while the specific button in the remote controller 200 is pressed down. That is, in case in which the remote controller 200 approaches or moves away from the display 180, vertical and lateral movements thereof may not be recognized, but back-and-forth movement thereof may be recognized. In case in which the specific button in the remote controller 200 is not pressed down, the pointer 205 only moves according to vertical and lateral movements of the remote controller 200

The speed and direction of movement of the pointer 205 may correspond to the speed and direction of movement of the remote controller 200.

Figure 5B:
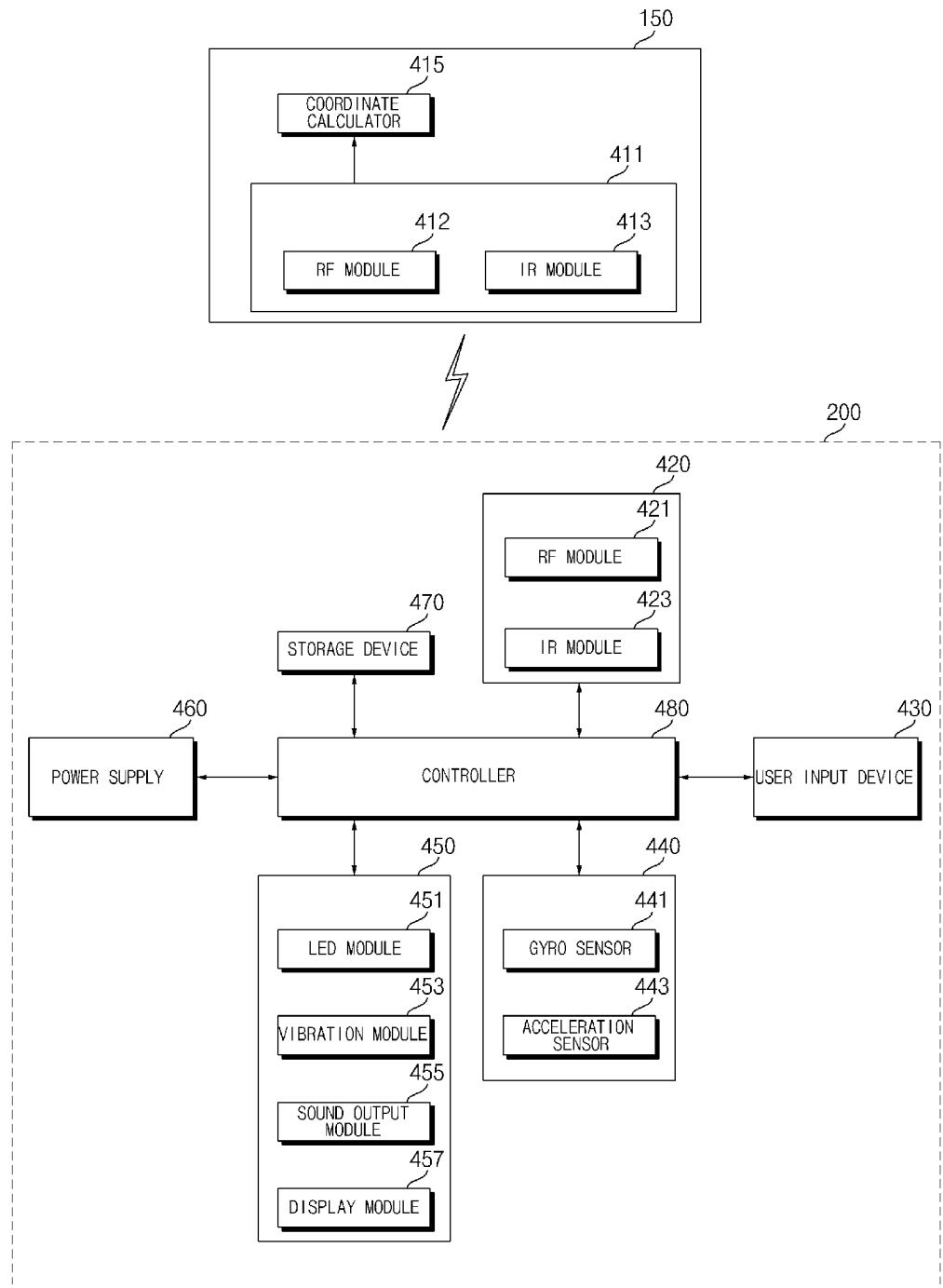
FIG. 5B is an internal block diagram illustrating the remote controller of FIG. 3.

FIG. 5B is an internal block diagram illustrating the remote controller of FIG. 3.

Referring to the drawing, the remote controller 200 may include a wireless transceiver 425, a user input device 430, a sensor device 440, an output device 450, a power supply 460, a storage device 470, and a controller 480.

The wireless transceiver 425 transmits and receives signals to and from one of the image display apparatuses according to embodiments of the present disclosure described above. Hereinafter, one image display apparatus 100 according to one embodiment of the present disclosure will be described.

In this embodiment, the remote controller 200 may include an RF module 421 capable of transmitting and receiving signals to and from the image display apparatus 100 according to an RF communication standard. The remote controller 200 may further include an IR module 423 capable of transmitting and receiving signals to and from the image display apparatus 100 according to an IR communication standard.

In this embodiment, the remote controller 200 transmits a signal including information about movement of the remote controller 200 to the image display apparatus 100 via the RF module 421.

In addition, the remote controller 200 may receive a signal from the image display apparatus 100 via the RF module 421. In case in which necessary, the remote controller 200 may transmit commands related to power on/off, channel change, and volume change to the image display apparatus 100 via the IR module 423.

The user input device 430 may include a keypad, a button, a touchpad, or a touchscreen. The user may input a command related to the image display apparatus 100 with the remote controller 200 by manipulating the user input device 435. In case in which the user input device 435 includes a hard key button, the user may input a command related to the image display apparatus 100 with the remote controller 200 by pressing the hard key button. In case in which the user input device 435 includes a touchscreen, the user may input a command related to the image display apparatus 100 with the remote controller 200 by touching a soft key on the touchscreen. The user input device 430 may include various kinds of input means such as a scroll key and a jog key which are manipulatable by the user, but it should be noted that this embodiment does not limit the scope of the present disclosure.

The sensor device 440 may include a gyro sensor 441 or an acceleration sensor 443. The gyro sensor 441 may sense information about movement of the remote controller 200.

For example, the gyro sensor 441 may sense information about movement of the remote controller 200 with respect to the X, Y and Z axes. The acceleration sensor 443 may sense information about the movement speed of the remote controller 200. The sensor device 440 may further include a distance measurement sensor to sense a distance to the display 180.

The output device 450 may output an image signal or voice signal corresponding to manipulation of the user input device 435 or a signal transmitted from the image display apparatus 100. The user may recognize, via the output device 450, whether the user input device 435 is manipulated or the image display apparatus 100 is controlled.

For example, the output device 450 may include an LED module 451 to be turned on in case in which the user input device 35 is operated or signals are transmitted to and received from the image display apparatus 100 via the wireless transceiver 425, a vibration module 453 to generate vibration, a sound output module 455 to output sound, or a display module 457 to output an image.

The power supply 460 supplies power to the remote controller 200. In case in which the remote controller 200 does not move for a predetermined time, the power supply 460 may stop supplying power to save power. The power supply 460 may resume supply of power in case in which the predetermined key provided to the remote controller 200 is manipulated.

The storage device 470 may store various kinds of programs and application data necessary for control or operation of the remote controller 200. In case in which the remote controller 200 wirelessly transmits and receives signals to and from the image display apparatus 100 via the RF module 421, the remote controller 200 and the image display apparatus 100 may transmit and receive signals in a predetermined frequency band. The controller 480 of the remote controller 200 may store, in the storage device 470, information about, for example, a frequency band enabling wireless transmission and reception of signals to and from the image display apparatus 100 which is paired with the remote controller 200, and reference the same.

The controller 480 controls overall operation related to control of the remote controller 200. The controller 480 may transmit, via the wireless transceiver 425, a signal corresponding to manipulation of a predetermined key in the user input device 435 or a signal corresponding to movement of the remote controller 200 sensed by the sensor device 440 to the image display apparatus 100.

The user input interface 150 of the image display apparatus 100 may include a wireless transceiver 151 capable of wirelessly transmitting and receiving signals to and from the remote controller 200 and a coordinate calculator 415 capable of calculating coordinates of the pointer corresponding to operation of the remote controller 200.

The user input interface 150 may wirelessly transmit and receive signals to and from the remote controller 200 via an RF module 412. In addition, the user input interface 150 may receive, via an IR module 413, a signal transmitted from the remote controller 200 according to an IR communication standard.

The coordinate calculator 415 may calculate coordinates (x, y) of the pointer 205 to be displayed on the display 180, by correcting hand tremor or an error in a signal corresponding to operation of the remote controller 200 which is received via the wireless transceiver 151.

The transmitted signal of the remote controller 200 input to the image display apparatus 100 via the user input interface 150 is transmitted to the signal processing device 170 of the image display apparatus 100. The signal processing device 170 may determine information about an operation of the remote controller 200 or manipulation of a key from the signal transmitted from the remote controller 200, and control the image display apparatus 100 according to the information.

As another example, the remote controller 200 may calculate coordinates of the pointer corresponding to movement thereof and output the same to the user input interface 150 of the image display apparatus 100. In this case, the user input interface 150 of the image display apparatus 100 may transmit, to the signal processing device 170, information about the received coordinates of the pointer without separately correcting hand tremor or the error.

As another example, in contrast with the example of the drawing, the coordinate calculator 415 may be provided in the signal processing device 170 rather than in the user input interface 150.

Figure 6:
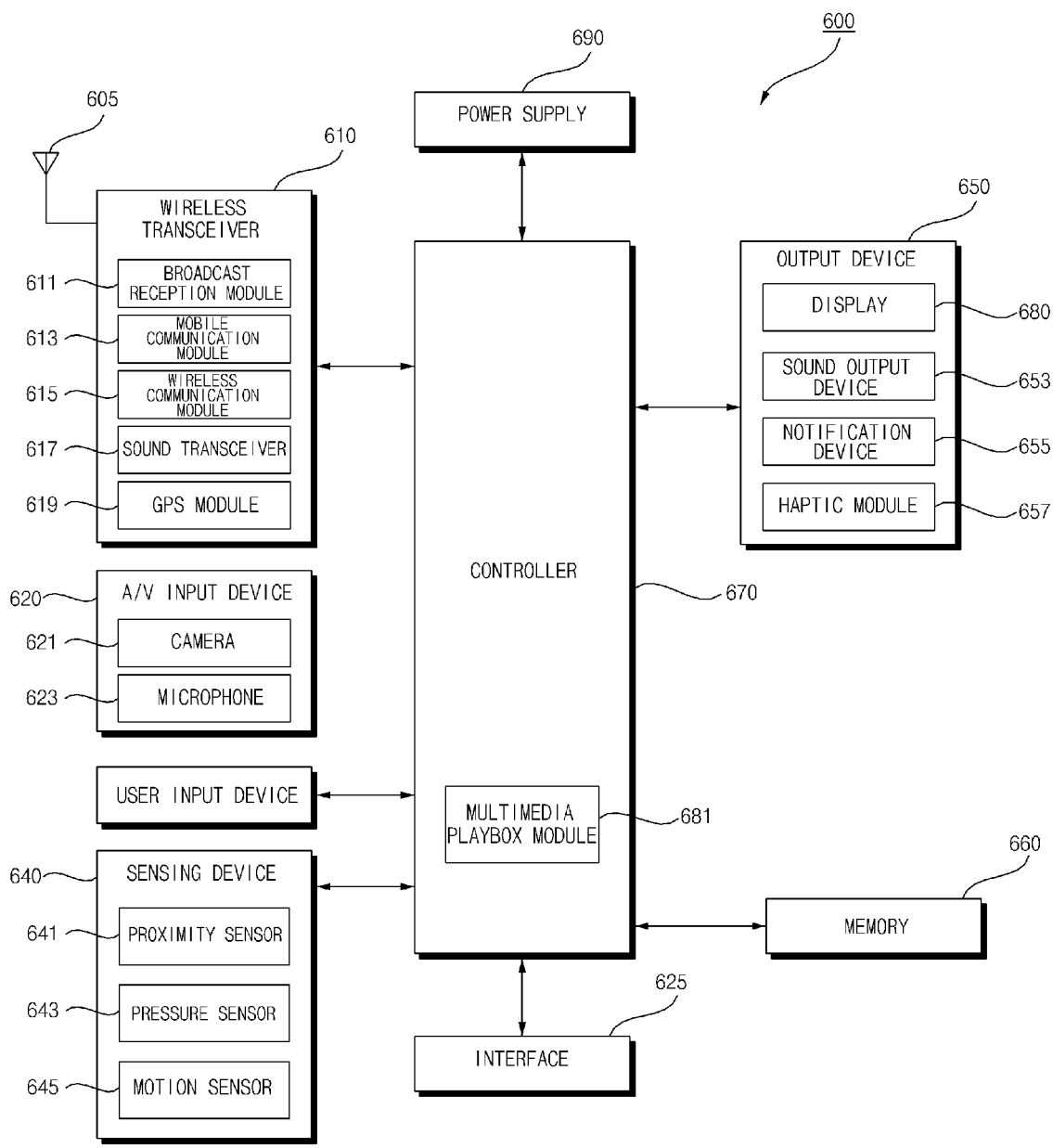
FIG. 6 is an internal block diagram illustrating a mobile terminal of FIG. 1.

FIG. 6 is an internal block diagram illustrating the mobile terminal of FIG. 1.

Referring to the drawing, the mobile terminal 600 may include a wireless transceiver 610, an audio/video (A/V) input device 620, a user input device 630, a sensing device 640, and an output device 650, a memory 660, an interface 625, a controller 670 and a power supply 690.

The wireless transceiver 610 may include a broadcast reception module 611, a mobile communication module 613, a wireless internet module 615, a sound transceiver 617, and a GPS module 619.

The broadcast reception module 611 may receive at least one of a broadcast signal or broadcast-related information from an external broadcast management server over a broadcast channel. Herein, the broadcast channel may include a satellite channel and a terrestrial channel.

The broadcast signal and/or broadcast-related information received through the broadcaster reception module 611 may be stored in the memory 660.

The mobile communication module 613 transmits and receives a radio signal to and from at least one of a base station, an external terminal or a server over a mobile communication network. Herein, the radio signal may include a voice call signal, a video call signal, or various kinds of data according to transmission and reception of a text/multimedia message.

The wireless internet module 615, which refers to a module for wireless internet access, may be installed inside or outside the mobile terminal 600. For example, the wireless internet module 615 may perform Wi-Fi-based wireless communication or Wi-Fi Direct-based wireless communication.

The sound transceiver 617 may perform sound communication. In the sound communication mode, the sound transceiver 617 may add data of predetermined information to audio data which is to be output and output sound. In addition, in the sound communication mode, the sound transceiver 617 may extract data of predetermined information from received sound.

Applicable short-range communication technologies may include Bluetooth, radio frequency identification (RFID), Infrared Data Association (IrDA), Ultra-Wideband (UWB), and ZigBee.

The GPS module 619 may receive location information from a plurality of GPS satellites.

The A/V input device 620 is used for input of an audio signal or a video signal and may include a camera 621 and a microphone 623.

The user input device 630 generates key input data input by the user to control operation of a terminal of the user. To this end, the user input device 630 may include a keypad, a dome switch, and a touchpad (resistive touchpad/capacitive touchpad). In particular, the touchpad may form a layered architecture together with the display 680, thereby realizing a touchscreen.

The sensing device 640 may generate a sensing signal for controlling operation of the mobile terminal 600 by sensing the current state of the mobile terminal 600, for example by sensing whether the mobile terminal 600 is in the open or closed position, where the mobile terminal 600 is located, and whether the user contacts the mobile terminal 600.

The sensing device 640 may include a proximity sensor 641, a pressure sensor 643 and a motion sensor 645. The motion sensor 645 may employ an acceleration sensor, a gyro sensor, a gravity sensor and the like to sense movement or the location of the mobile terminal. In particular, the gyro sensor, which is used to measure an angular speed, may sense orientation (angle) of the mobile terminal with respect to a reference direction.

The output device 650 may include a display 680, an audio output device 653, a notification device 655, and a haptic module 657.

The display 680 outputs and displays information processed by the mobile terminal 600.

As described above, in case in which the display 680 forms a layered architecture with the touchpad to implement a touchscreen, the display 680 may be used not only as an output device but also as an input device for input of information according to user touch.

The audio output device 653 outputs audio data received from the wireless transceiver 610 or stored in the memory 660. The audio output device 653 may include a speaker and a buzzer.

The notification device 655 outputs a signal for reporting occurrence of an event in the mobile terminal 600. For example, the notification device 655 may output a signal in the form of vibration.

The haptic module 657 generates various haptic effects which may be felt by the user. A typical example of the haptic effects generated by the haptic module 657 is vibration.

The memory 660 may store a program for processing and control of the controller 670, and functions to temporarily store input data or output data (e.g., a phonebook, a message, a still image, a moving image, or the like).

The interface 625 serves as an interface for all devices connected to the mobile terminal 600. The interface 625 may serve to receive data or power from external devices and transfer the same to the internal constituents of the mobile terminal 600 and to transmit data from the mobile terminal 600 to external devices.

The controller 670 typically controls operations of the aforementioned respective elements, thereby controlling overall operation of the mobile terminal. For example, the controller 670 may perform control or processing related to voice communication, data communication, video communication, and the like. The controller 670 may also include a multimedia playback module 681 to reproduce multimedia. The multimedia playback module 681 may be provided in the controller 670 as hardware or may be configured separately from the controller 670.

The power supply 690 supplies power necessary for operations of the respective constituents according to control of the controller 670 in case in which external power or internal power is applied thereto.

The block diagram of the mobile terminal 600 illustrated in FIG. 6 is simply illustrative. The respective constituents of the block diagram may be integrated, added or omitted according to the specifications of the mobile terminal 600. That is, two or more constituents may be combined into one constituent, or one constituent may be subdivided into two or more constituents, in case in which necessary. In addition, the function performed in each block is simply illustrative, and it should be noted that specified operations or devices of the blocks do not limit the scope of the present disclosure.

Figure 7:
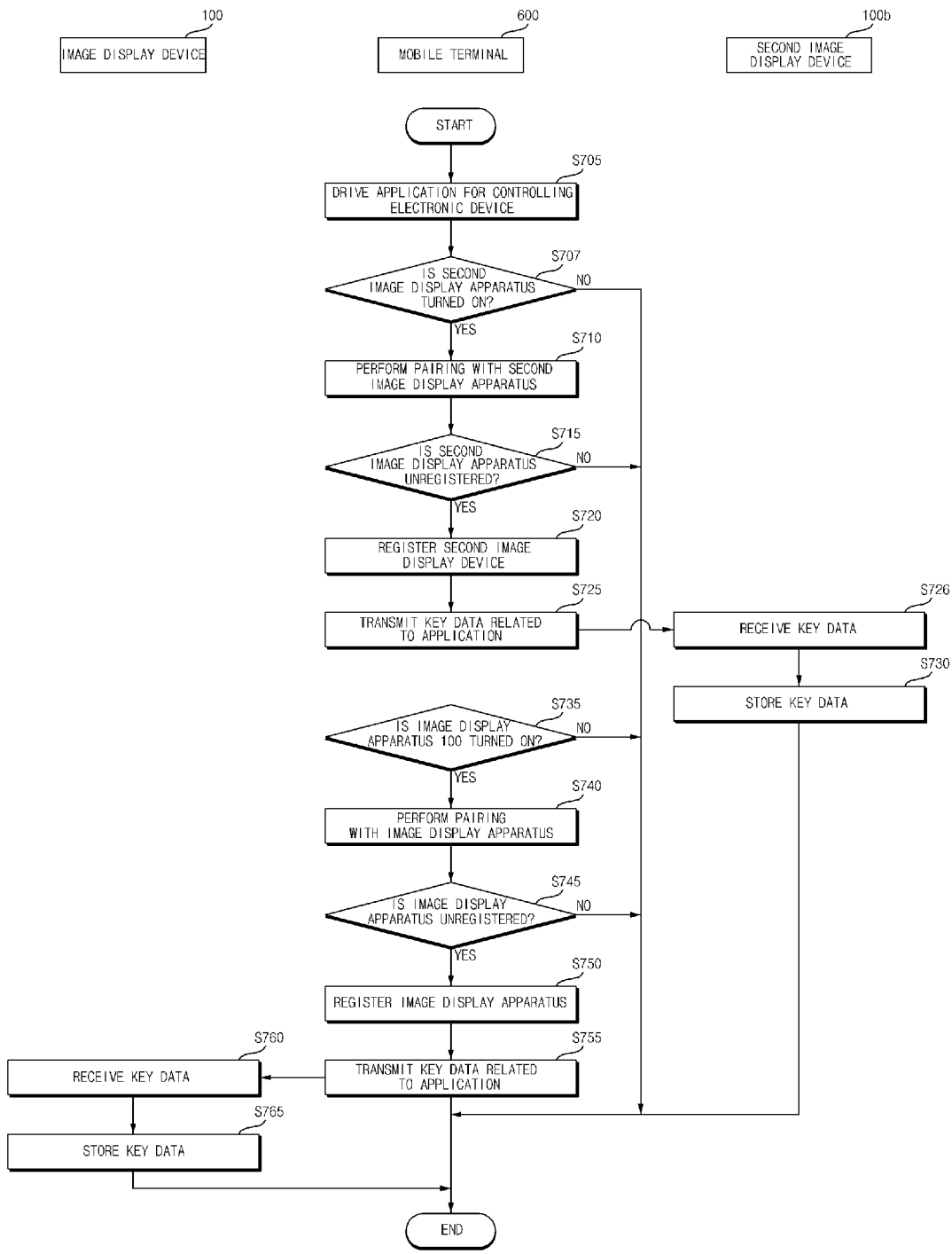
FIG. 7 is a flowchart illustrating an example of an operation method of the image display system according to one embodiment of the present disclosure.

FIG. 7 is a flowchart illustrating an example of an operation method of the image display system according to one embodiment of the present disclosure.

Referring to the drawing, the mobile terminal 600 executes the application for controlling the electronic device based on user input, or the like (S705).

Figure 9A:
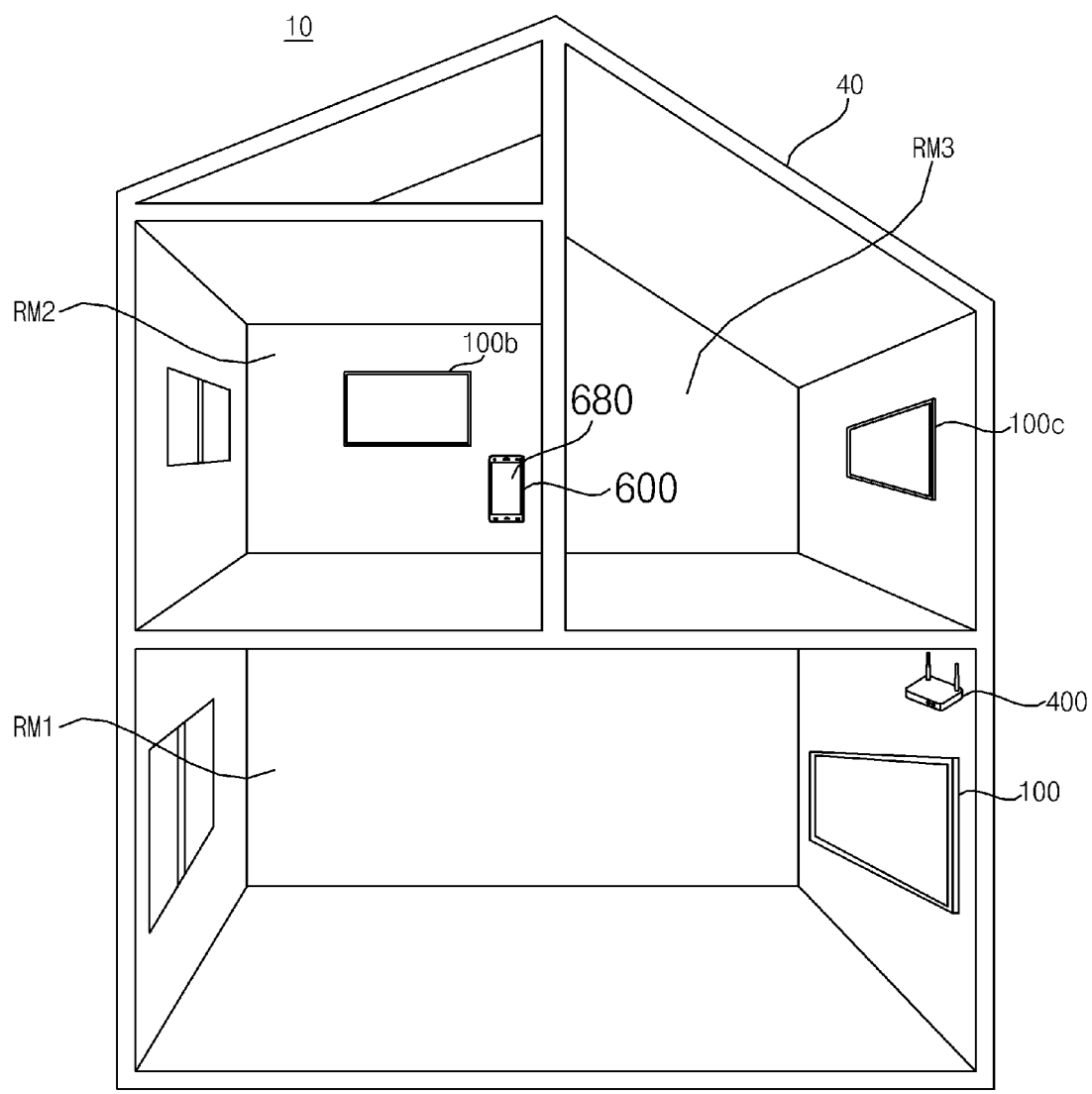
FIGS. 9A to 11F are diagrams referenced in the description of the operation method of FIG. 7 or FIG. 8.
Figure 9B:
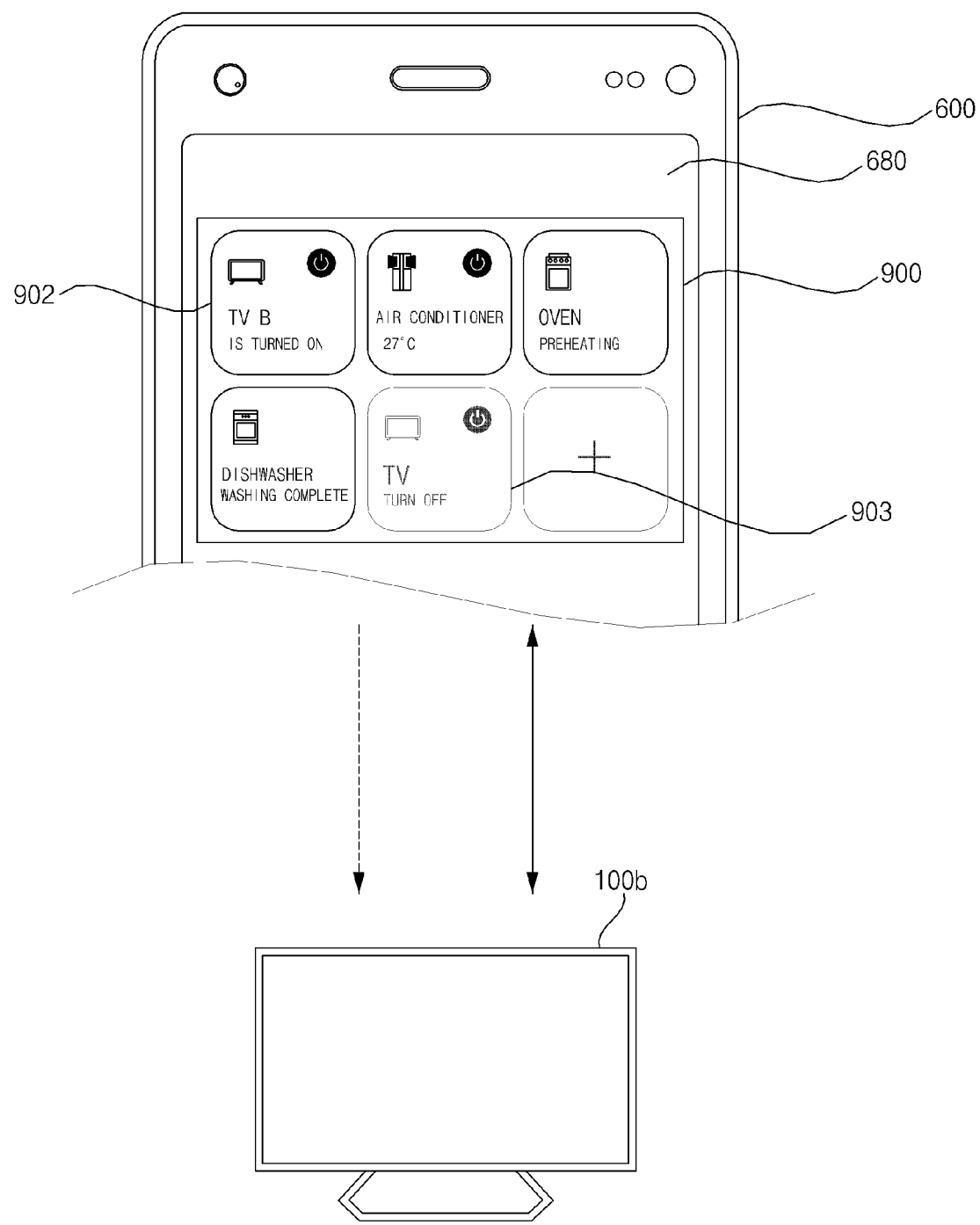

For example, an application screen 900 for controlling an electronic device, as illustrated in FIG. 9B, may be displayed on the display 680.

The application screen 900 for controlling the electronic device may include items for controlling a plurality of electronic devices, and FIG. 9B illustrates that the application screen 900 for controlling the electronic device includes a TV item, a TV B item 902, an air conditioner item, an oven item, a dishwasher item, or the like.

Meanwhile, the mobile terminal 600 determines whether the second image display apparatus 100b among the surrounding electronic devices is turned on (S707), and in case in which the second image display apparatus 100b is turned on, the mobile terminal 600 may perform pairing with the second image display apparatus 100b (S710).

For example, in case in which the second image display apparatus 100b is turned on, the mobile terminal 600 may transmit a pairing request signal to the second image display apparatus 100b and receive a pairing response signal from the second image display apparatus 100b. Accordingly, the pairing may be performed.

As another example, in case in which the second image display apparatus 100b is turned on, the second image display apparatus 100b may transmit a pairing request signal to the mobile terminal 600 and receive a pairing response signal from the mobile terminal 600. Accordingly, the pairing can be performed.

Meanwhile, the mobile terminal 600 may display information indicating that the second image display apparatus 100b is turned on after pairing with the second image display apparatus 100b. In relation to this, FIG. 9B illustrates that information indicating that the second image display apparatus 100b is turned on is displayed in the TV B item 902.

Meanwhile, in case in which the image display apparatus 100 is in an off state and the wireless pairing is not performed, the mobile terminal 600 may display off information of the image display apparatus 100 in the TV item, as illustrated in FIG. 9B.

The mobile terminal 600 may receive information about the second image display apparatus 100b through the wireless pairing. For example, the mobile terminal 600 may receive device information, product number information, or the like of the second image display apparatus 100b.

The mobile terminal 600 may determine whether the second image display apparatus is unregistered based on the received information about the second image display apparatus 100b (S715).

Additionally, the mobile terminal 600 may be configured to perform the product registration in case in which the second image display apparatus 100b is in unregistered (S725).

For example, the mobile terminal 600 may be connected to a server (not illustrated) of an electronic device manufacturer, transmit the product number information of the second image display apparatus to the server (not illustrated), and perform control so that the second image display apparatus 100b is registered in the server (not illustrated).

As another example, the mobile terminal 600 may be configured to register the device information, the product number information, or the like of the second image display apparatus in the application for controlling the electronic device.

The mobile terminal 600 may transmit key data related to the application for controlling the electronic device to the second image display apparatus 100b after registration of the second image display apparatus 100b or based on user input, or the like (S725).

Accordingly, a network interface 135b or an external device interface 130b of the second image display apparatus 100b may receive the key data (S726) and store the key data in the memory 140b (S730).

Next, the mobile terminal 600 determines whether the image display apparatus 100 among the surrounding electronic devices is turned on (S735), and in case in which the image display apparatus 100 is turned on, the mobile terminal 600 may perform pairing with the image display apparatus 100 (S740).

For example, in case in which the image display apparatus 100 is turned on, the mobile terminal 600 may transmit a pairing request signal to the image display apparatus 100 and receive a pairing response signal from the image display apparatus 100. Accordingly, the pairing may be performed.

As another example, in case in which the image display apparatus 100 is turned on, the image display apparatus 100 may transmit the pairing request signal to the mobile terminal 600 and receive the pairing response signal from the mobile terminal 600. Accordingly, the pairing may be performed.

Meanwhile, the mobile terminal 600 may display information indicating that the image display apparatus 100 is turned on after pairing with the image display apparatus 100. In this regard, FIG. 10B illustrates information indicating that the image display apparatus 100 is turned in the TV item 903 while indicating that the second image display apparatus 100b is turned on in the TV B item 902.

The mobile terminal 600 may receive information about the image display apparatus 100 through the wireless pairing. For example, the mobile terminal 600 may receive the device information, the product number information, or the like of the image display apparatus 100.

The mobile terminal 600 may determine whether the image display apparatus 100 is unregistered based on the received information about the image display apparatus 100 (S745).

Additionally, the mobile terminal 600 may be configured to perform the product registration in case in which the image display apparatus 100 is unregistered (S750).

For example, the mobile terminal 600 may be connected to a server (not illustrated) of an electronic device manufacturer, transmit the device information, the product number information, or the like of the image display apparatus 100 to the server (not illustrated), and perform control so that the image display apparatus 100 is registered in the server (not illustrated).

As another example, the mobile terminal 600 may perform control so that device information, product number information, or the like of the image display apparatus 100 is registered in the application for controlling the electronic device.

The mobile terminal 600 may transmit the key data related to the application for controlling the electronic device to the image display apparatus 100 after registration of the image display apparatus 100 or based on user input, or the like (S755).

Accordingly, the network interface 135 or external device interface 130 of the image display apparatus 100 may receive the key data (S760) and store the key data in the memory 140 (S765).

The key data may be transmitted from the mobile terminal 600 in case in which the application for controlling the electronic device is executed in the mobile terminal 600.

Meanwhile, in case in which the second image display apparatus 100*b* is turned on in a state where the application for controlling the electronic device is executed in the mobile terminal 600, the pairing between the mobile terminal 600 and the second image display apparatus 100*b* may be performed, and after performing the pairing with the second image display apparatus 100*b*, the mobile terminal 600 transmits the key data related to the application to the second image display apparatus 100*b*. Moreover, in case in which the image display apparatus 100 is turned on in a state where the application for controlling the electronic device is executed in the mobile terminal 600, the pairing between the mobile terminal 600 and the image display apparatus 100 may be performed, and after performing the pairing with the mobile terminal 600, the image display apparatus 100 may receive the key data related to the application.

Figure 8:
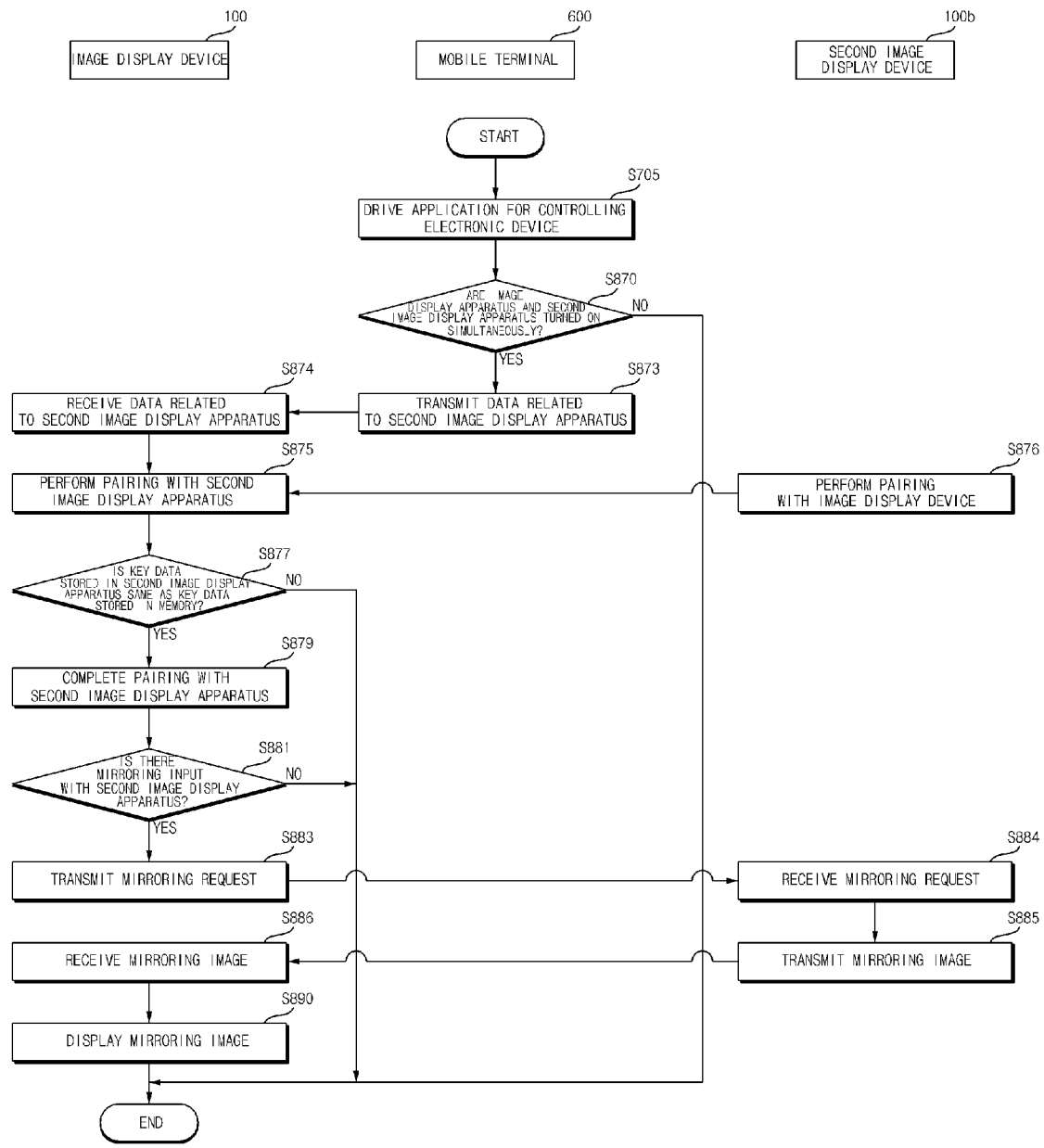
FIG. 8 is a flowchart illustrating another example of the operation method of the image display system according to one embodiment of the present disclosure.

FIG. 8 is a flowchart illustrating another example of the operation method of the image display system according to one embodiment of the present disclosure.

Referring to the drawing, the mobile terminal 600 executes the application for controlling the electronic device based on the user input, or the like (S705).

For example, the application screen 900 for controlling the electronic device, as illustrated in FIG. 10B, may be displayed on the display 680.

The application screen 900 for controlling the electronic device may include items for controlling a plurality of electronic devices.

The mobile terminal 600 determines whether both the image display apparatus 100 and the second image display apparatus 100*b* are turned on (S870).

For example, in case in which both the image display apparatus 100 and the second image display apparatus 100*b* are turned on, the mobile terminal 600 may perform wireless pairing with each of the image display apparatus 100 and the second image display apparatus 100*b*. In particular, the mobile terminal 600 may perform multi-pairing with the image display apparatus 100 and the second image display apparatus 100*b*.

In FIG. 10B, both the image display apparatus 100 and the second image display apparatus 100*b* are turned on, the information indicating that the image display apparatus 100 is turned on is displayed in the TV item 903, and the information indicating that the second image display apparatus 100*b* is turned on is displayed in the TV B item 902.

Next, the mobile terminal 600 may transmit data related to the second image display apparatus 100*b* to the image display apparatus 100 based on user input, or the like (S873).

The data related to the second image display apparatus 100*b* may include key data information stored in the second image display apparatus 100*b*, wireless network information of the second image display apparatus 100*b*, or the like.

Next, the network interface 135 or external device interface 130 of the image display apparatus 100 may receive data related to the second image display apparatus 100*b* from the mobile terminal 600 (S874).

In particular, the network interface 135 or external device interface 130 of the image display apparatus 100 may receive key data information stored in the second image display apparatus 100*b*, wireless network information of the second image display apparatus 100*b*, or the like.

Next, the network interface 135 or external device interface 130 of the image display apparatus 100 may perform pairing with the second image display apparatus 100*b* based on the received data related to the second image display apparatus 100*b* (S875).

For example, the network interface 135 or external device interface 130 of the image display apparatus 100 may transmit a pairing request signal including a plurality of pieces of frequency channel information to the second image display apparatus 100*b*, and may receive a pairing response signal including frequency channel information selected from the second image display apparatus 100*b*.

Meanwhile, it is determined whether the key data stored in the second image display apparatus 100*b* is the same as the key data stored in the memory of the image display apparatus 100 (S877), and if it is the same, the network interface 135 or external device interface 130 of the image display apparatus 100 completes pairing with the second image display apparatus 100*b* (S879).

In particular, in case in which the key data stored in the second image display apparatus 100*b* is the same as the key data stored in the memory 140, the signal processing device 170 of the image display apparatus 100 may perform control to complete pairing with the second image display apparatus 100*b*.

In case in which the key data stored in the second image display apparatus 100*b* is not the same as the key data stored in the memory of the image display apparatus 100, the network interface 135 or external device interface 135 of the image display apparatus 100 may stop the pairing with the second image display apparatus 100*b*.

Next, the signal processing device 170 determines whether there is mirroring input with the second image display apparatus 100*b* (S881), and in case in which the mirroring input is received, the network interface 135 or external device interface 130 of the image display apparatus 100 may receive a mirroring image from the second image display apparatus 100*b* or transmit the displayed image to the second image display apparatus 100*b*.

For example, in case in which the mirroring input is received, the network interface 135 or external device interface 130 of the image display apparatus 100 transmits a mirroring request to the second image display apparatus 100*b* (S883), the second image display apparatus 100*b* receives a mirroring request (S884) and transmits a mirroring image in response to the mirroring request (S885).

Accordingly, the network interface 135 or external device interface 130 of the image display apparatus 100 receives the mirroring image, the signal processing device 170 performs signal processing such as scaling on the received image, and is configured to display the signal-processed mirroring image on the display 180 (S890).

Accordingly, mirroring can be easily performed between the plurality of image display apparatuses 100 and 100b. In particular, the mirroring can be easily performed between the plurality of image display apparatuses 100 and 100b using the application of the mobile terminal 600.

Unlike FIG. 8, the network interface 135 or external device interface 130 of the image display apparatus 100 first receives data related to the second image display apparatus 100b from the mobile terminal 600, and after receiving the data, in case in which the second image display apparatus 100b is turned on, the network interface 135 or external device interface 130 may perform pairing with the second image display apparatus 100b.

FIGS. 9A to 11F are diagrams referenced in the description of the operation method of FIG. 7 or FIG. 8.

FIG. 9A is a diagram illustrating that the mobile terminal 600 and the second image display apparatus 100b are located in a second space (Rm2) within a building 40.

In case in which the second image display apparatus 100b is turned on, the mobile terminal 600 and the second image display apparatus 100b may perform pairing.

In particular, in case in which the application for controlling the electronic device is executed in the mobile terminal 600, the mobile terminal 600 and the second image display apparatus 100b may perform pairing.

FIG. 9B is a diagram illustrating that an application screen 900 in which the application for controlling the electronic device is executed is displayed on the display 680 of the mobile terminal 600.

The application screen 900 may include the TV item, the TV B item 902, the air conditioner item, the oven item, and the dishwasher item.

In particular, since the second image display apparatus 100b is turned on, information indicating that the second image display apparatus 100b is turned on may be displayed in the TV B item 902.

Meanwhile, since the image display apparatus 100 located in the first space RM1 is turned off, information indicating that the image display apparatus 100 is off may be displayed in the TV item 903.

Figure 9C:
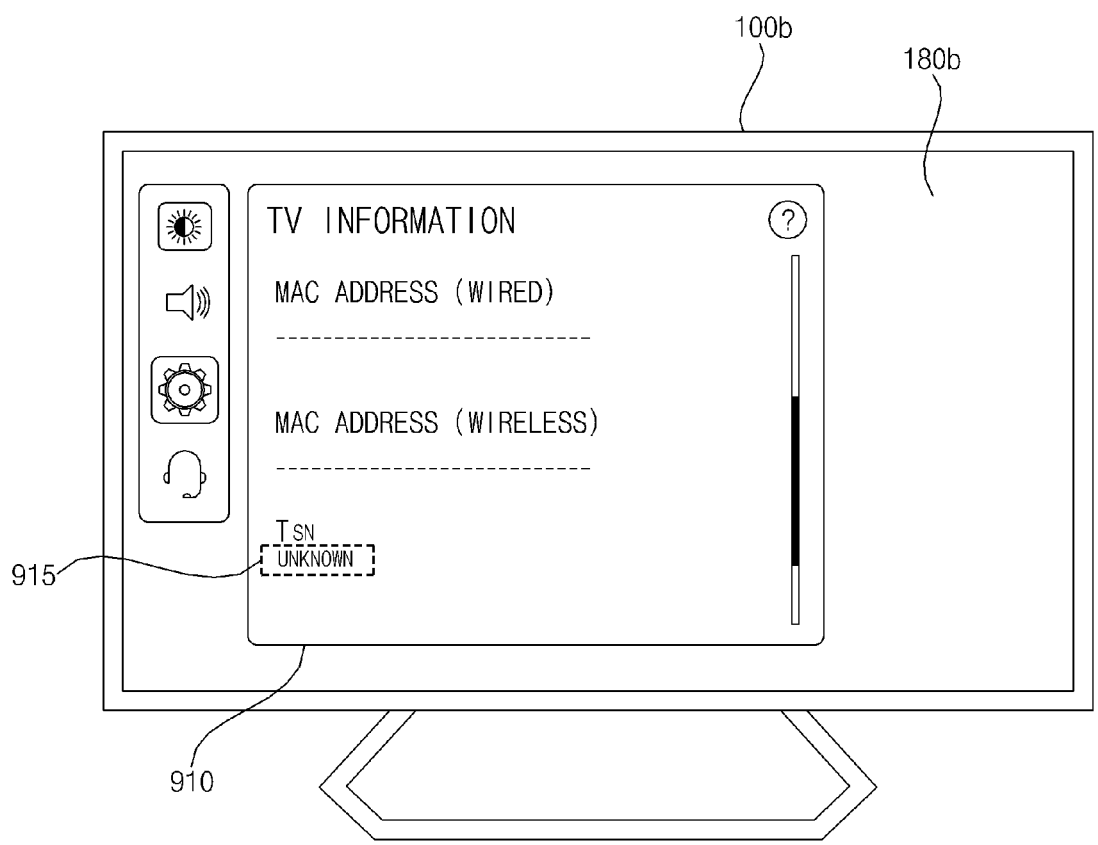

FIG. 9C illustrates an example of a setting screen 910 displayed on the display 180b of the second image display apparatus 100b.

The setting screen 910 may include wired network information, wireless network information, and key data information of the second image display apparatus 100b.

Meanwhile, FIG. 9C illustrates that a message 915 indicating no data is displayed without key data information stored in the second image display apparatus 100b.

The mobile terminal 600 may transmit the key data related to the application for controlling the electronic device to the second image display apparatus 100b after registration of the second image display apparatus 100b. Accordingly, the second image display apparatus 100b may store the received key data.

Figure 9D:
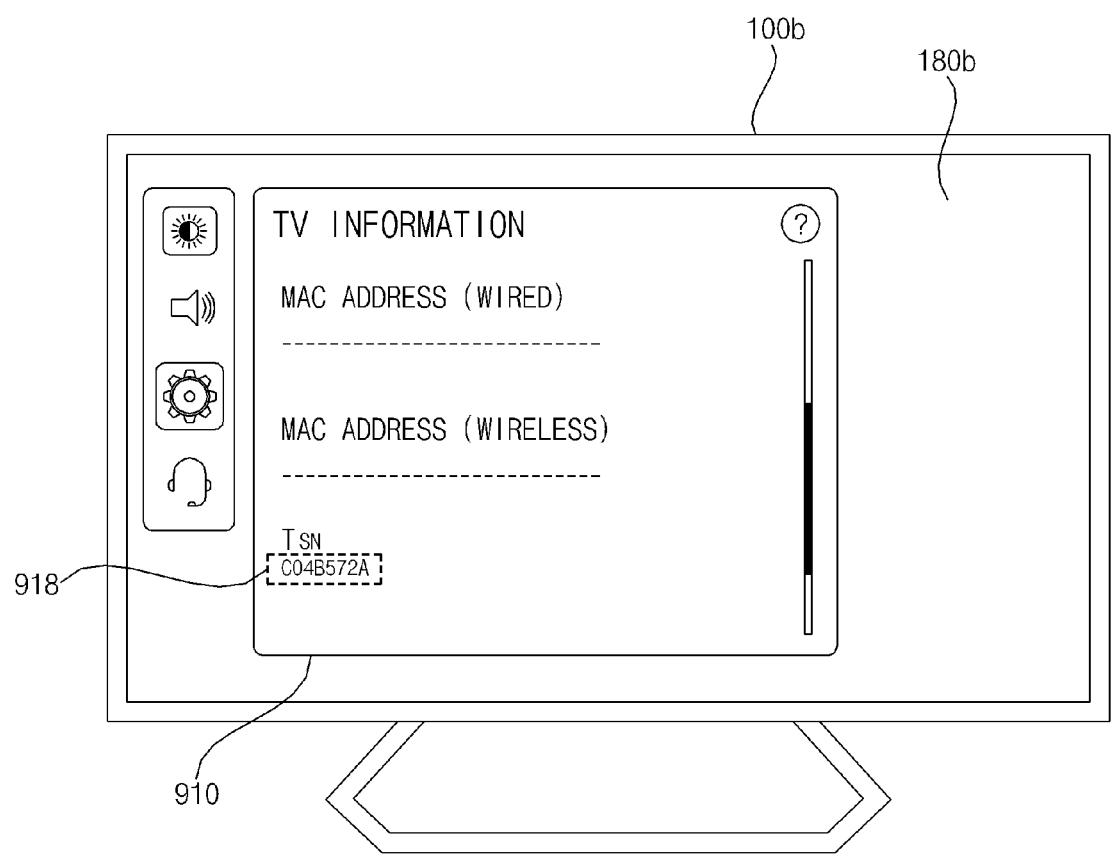

FIG. 9D illustrates another example of the setting screen 910 displayed on the display 180b of the second image display apparatus 100b.

The setting screen 910 may include wired network information, wireless network information, and key data information of the second image display apparatus 100b.

Meanwhile, FIG. 9C illustrates that key data information 918 stored in the second image display apparatus 100b is displayed.

Figure 10A:
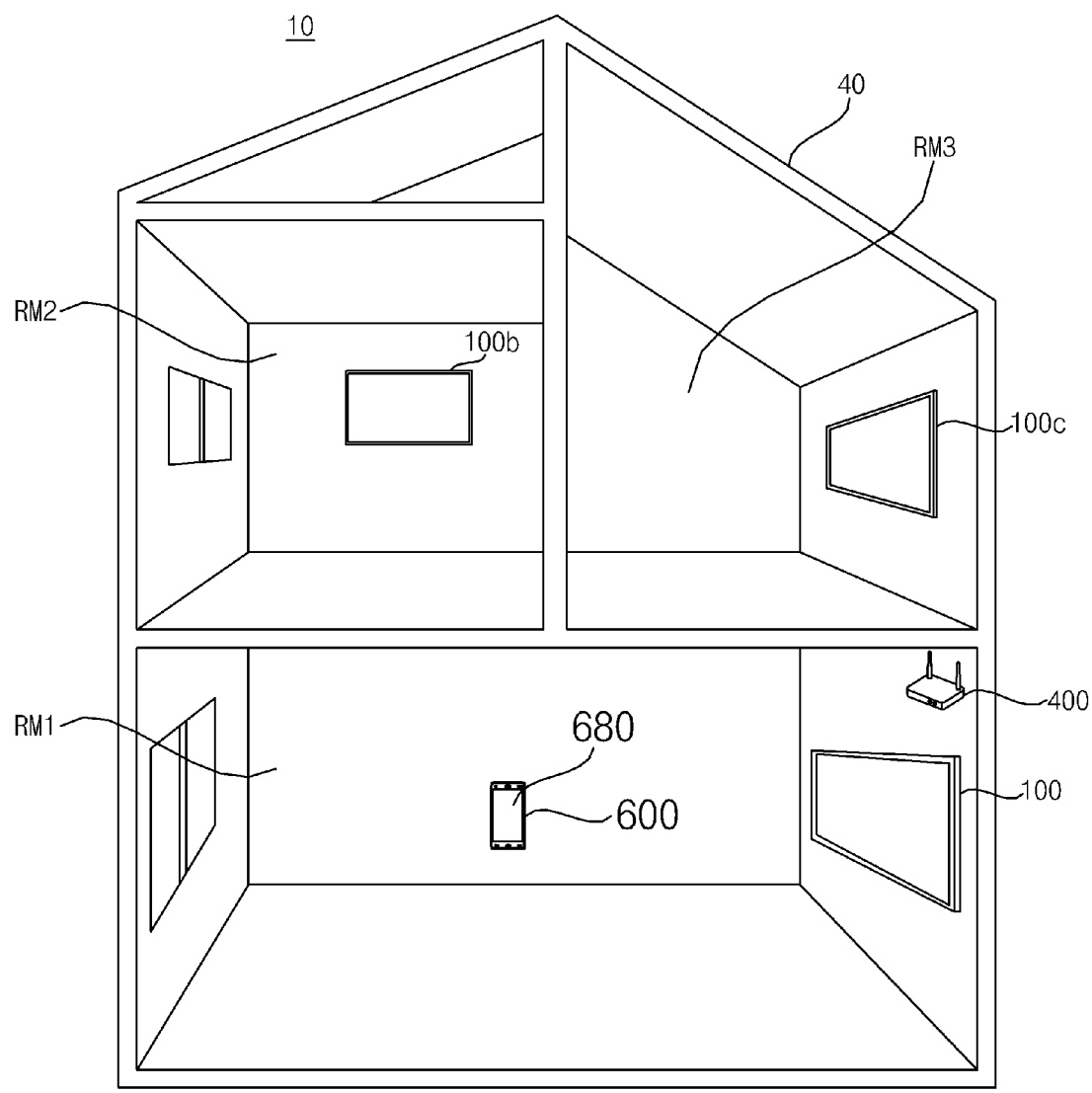
Figure 10B:
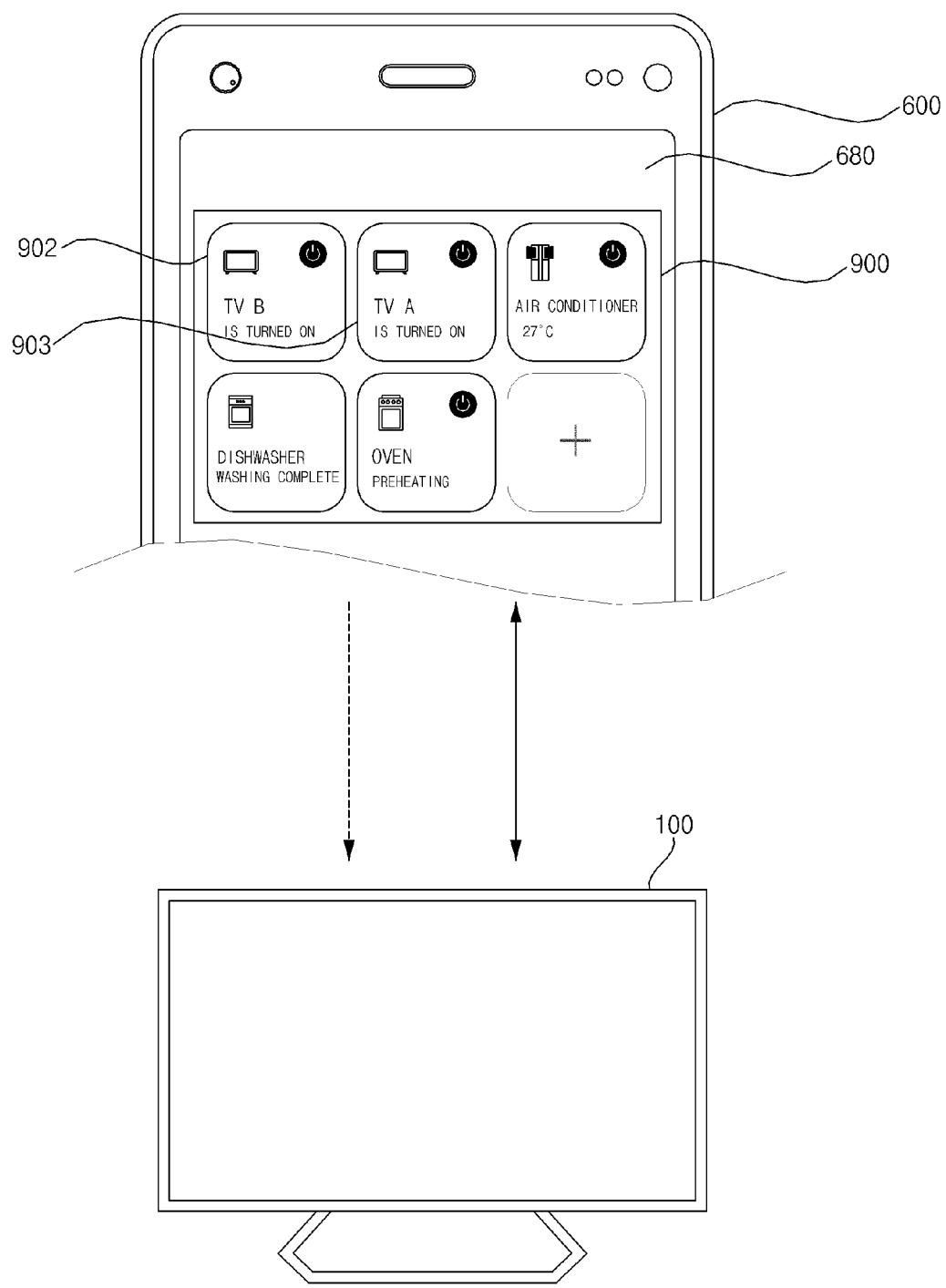

FIG. 10A is a diagram illustrating that the mobile terminal 600 and the image display apparatus 100 are located in a first space Rm1 within the building 40.

In case in which the image display apparatus 100 is turned on, the mobile terminal 600 and the image display apparatus 100 may perform pairing.

In particular, in case in which the application for controlling the electronic device is executed in the mobile terminal 600, the mobile terminal 600 and the image display apparatus 100 may perform pairing.

FIG. 10B is a diagram illustrating the application screen 900 in which the application for controlling the electronic device is executed displayed on the display 680 of the mobile terminal 600.

The application screen 900 may include the TV item 903, the TV B item 902, the air conditioner item, the oven item, and the dishwasher item.

In particular, since the image display apparatus 100 is turned on, information indicating that the image display apparatus 100 is turned on may be displayed in the TV item 903.

Meanwhile, since the second image display apparatus 100b is turned on, information indicating that the second image display apparatus 100b is turned on may be displayed in the TV B item 902.

Figure 10C:
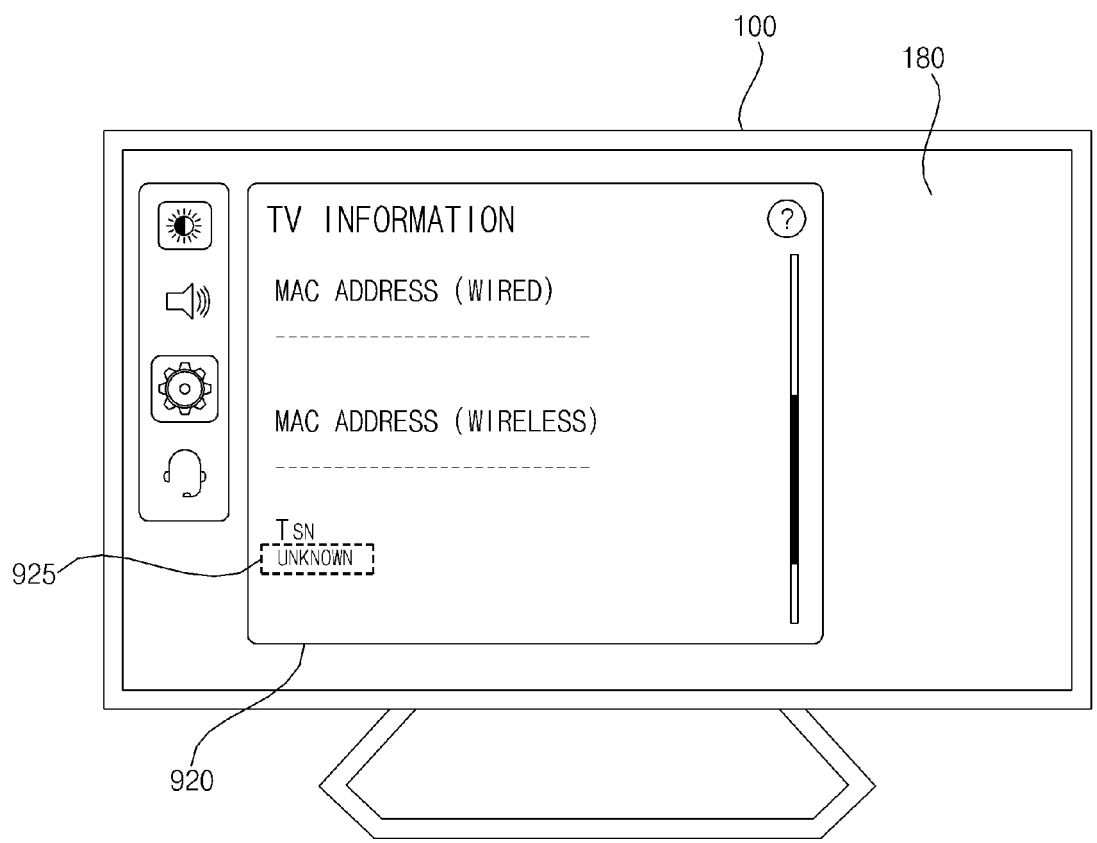

FIG. 10C illustrates an example of a setting screen 920 displayed on the display 180 of the image display apparatus 100.

The setting screen 920 may include wired network information, wireless network information, and key data information of the image display apparatus 100.

Meanwhile, FIG. 10C indicates that a message 925 indicating no data is displayed without key data information stored in the image display apparatus 100.

The mobile terminal 600 may transmit the key data related to the application for controlling the electronic device to the image display apparatus 100 after registration of the image display apparatus 100. Accordingly, the image display apparatus 100 may store the received key data.

Figure 10D:
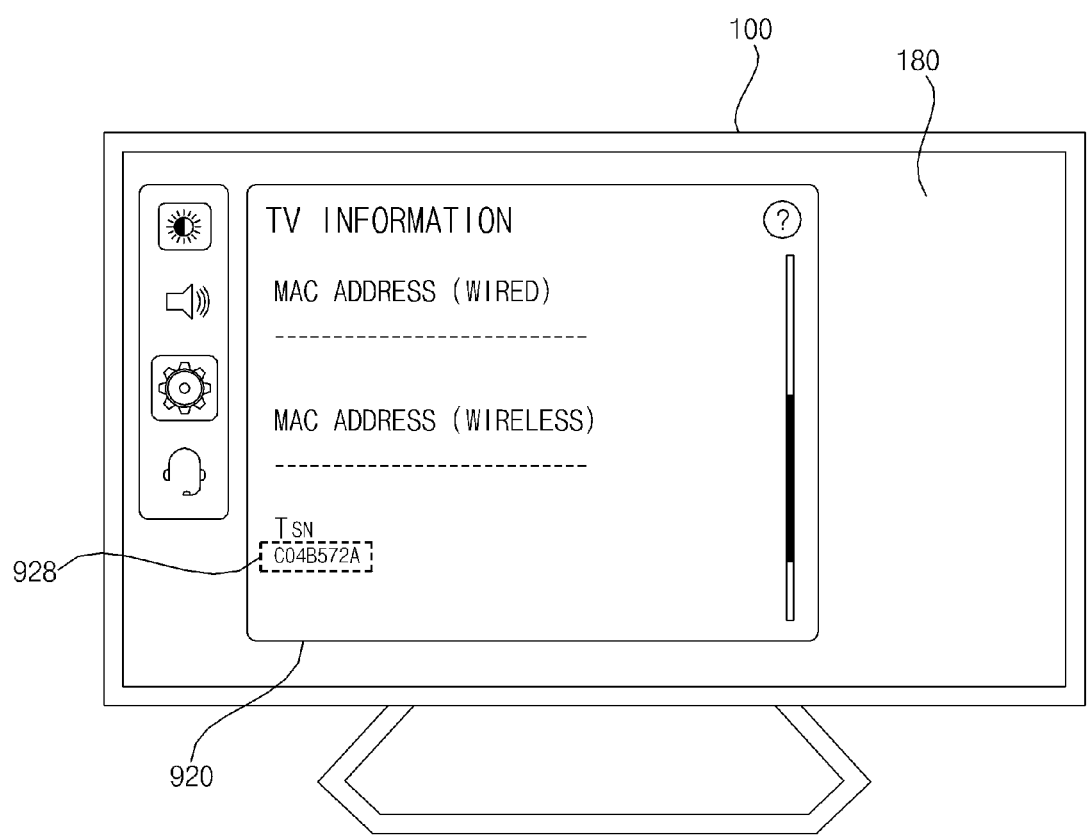

FIG. 10D illustrates another example of the setting screen 920 displayed on the display 180 of the image display apparatus 100.

Meanwhile, the signal processing device 170 of the image display apparatus 100 perform control to display the setting screen 920 including the key data according to the setting screen display input. Accordingly, the key data can be easily confirmed.

Meanwhile, after receiving the key data from the mobile terminal 600, the signal processing device 170 of the image display apparatus 100 may be configured to display the setting screen 920 including the key data in case in which there is the setting screen display input.

The setting screen 920 may include wired network information, wireless network information, and key data information of the image display apparatus 100.

Meanwhile, FIG. 10C illustrates that key data information 928 stored in the image display apparatus 100 is displayed.

Figure 11A:
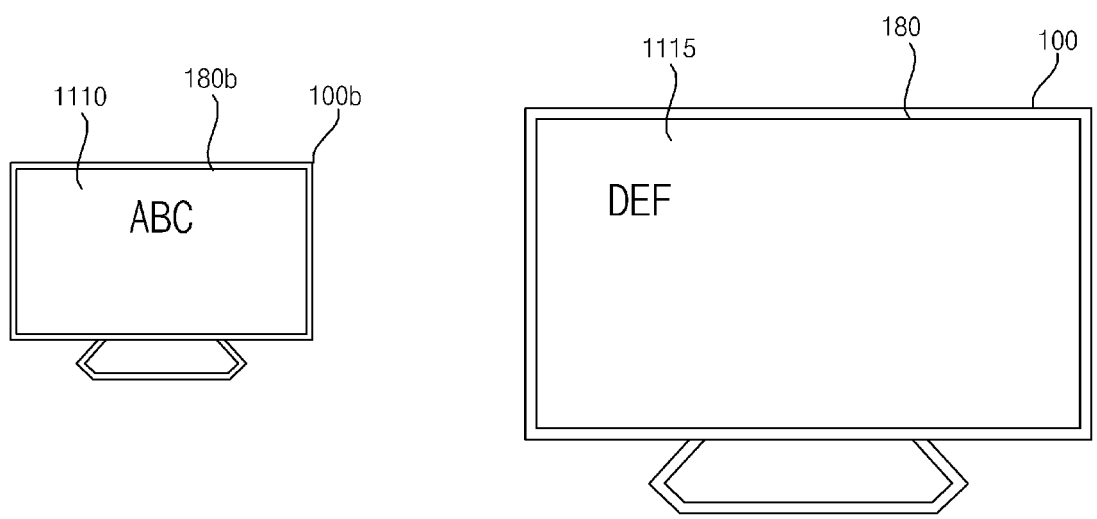
Figure 11B:
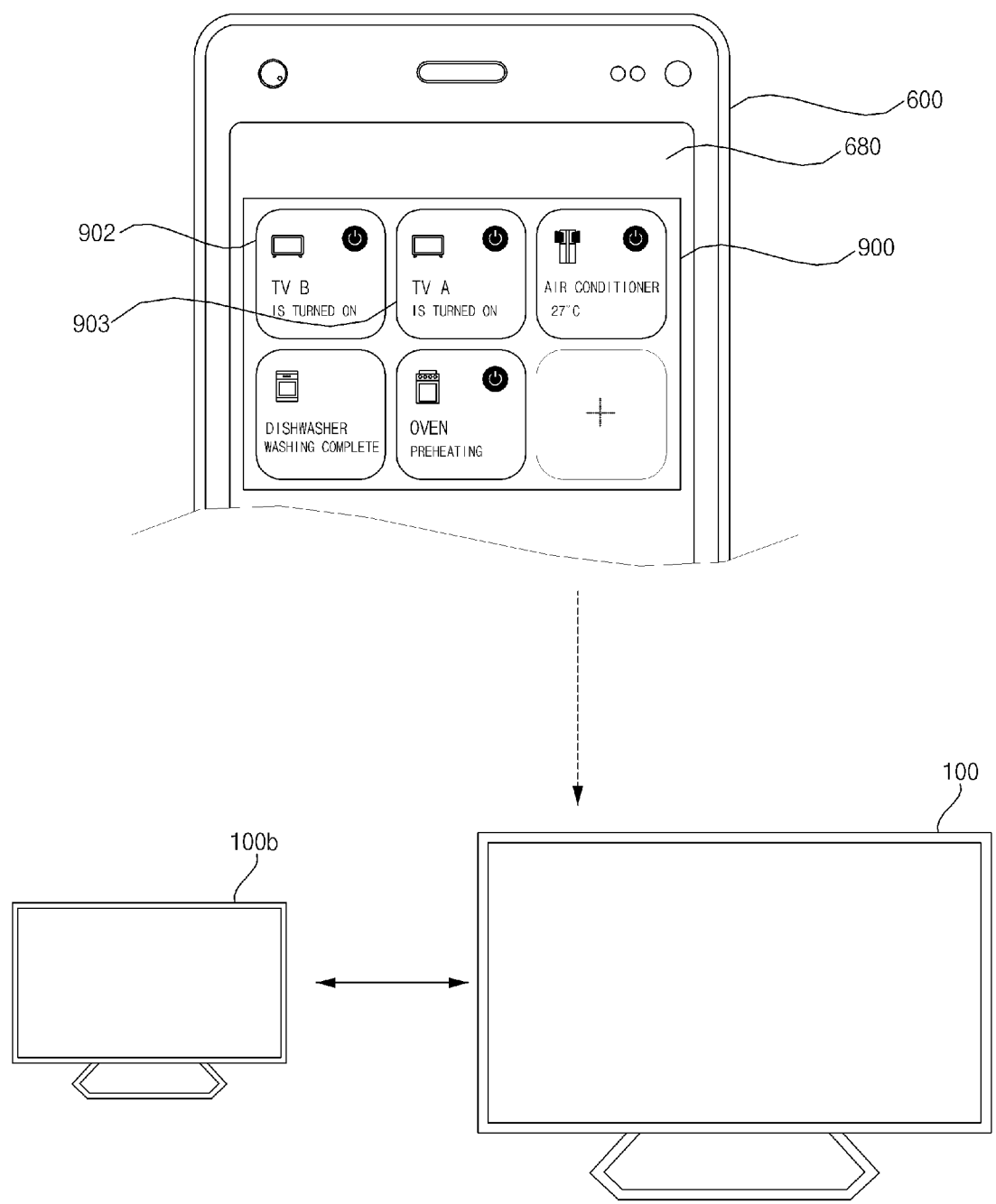

FIG. 11A illustrates that the image display apparatus 100 and the second image display apparatus 100b display different images 110 and 1115, respectively.

Before the image display apparatus 100 and the second image display apparatus 100b are wirelessly paired, the image display apparatus 100 may display the first image 110, and the second image display apparatus 100b may display the second image 1115.

Next, in a state where the application for controlling the electronic device is executed in the mobile terminal 600, the mobile terminal 600 may transmit information about the second image display apparatus 100b to the image display apparatus 100.

In particular, in case in which the image display apparatus 100 is turned on and wirelessly paired with the mobile terminal 600 in a state where the application for controlling electronic devices is executed in the mobile terminal 600, the mobile terminal 600 may transmit information about the second image display apparatus 100b to the image display apparatus 100.

Figure 11C:
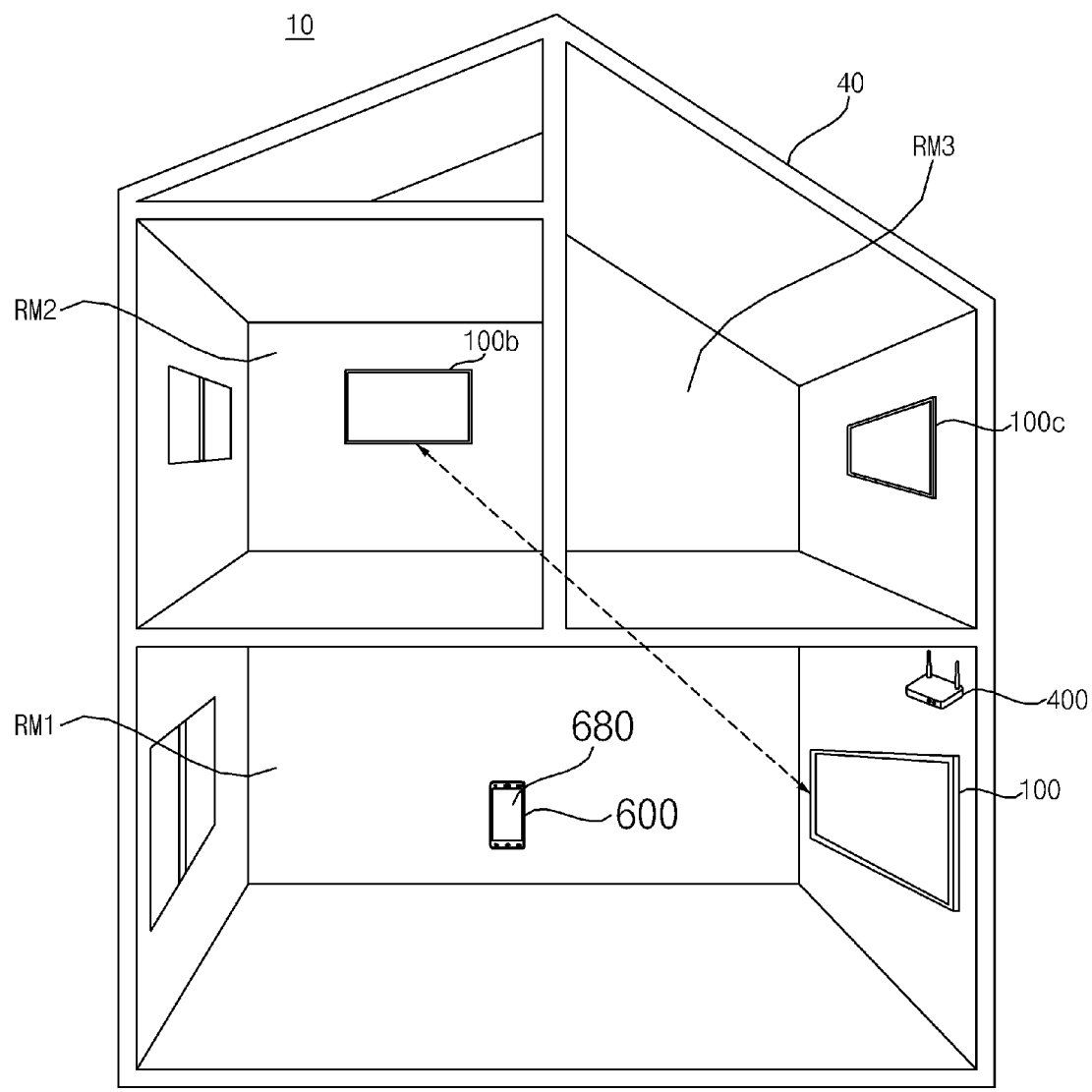
Figure 11D:
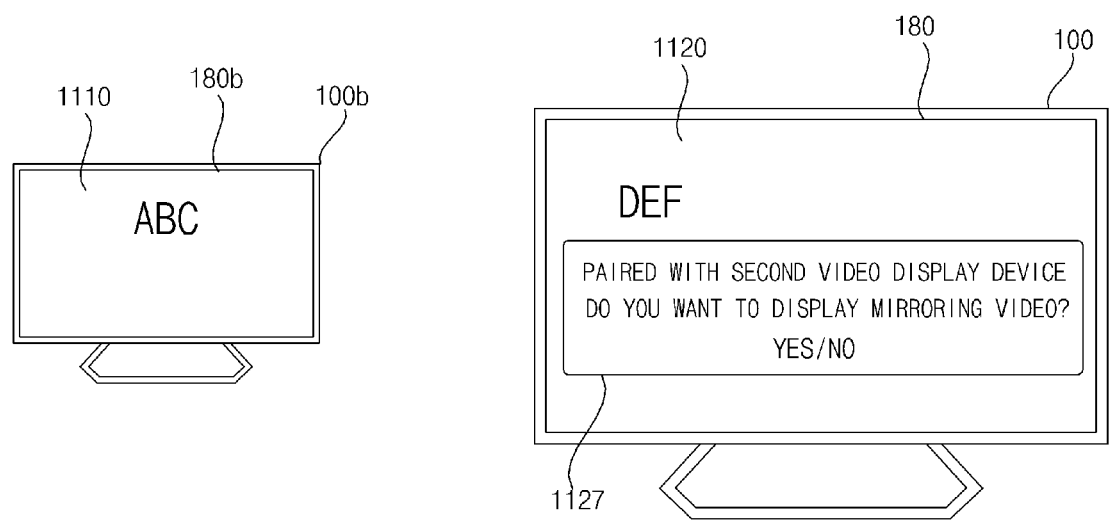

FIG. 11C is a diagram illustrating transmission of information about the second image display apparatus 100b from the mobile terminal 600 to the image display apparatus 100.

The information about the second image display apparatus 100b may include key data information stored in the second image display apparatus 100b, wireless network information of the second image display apparatus 100b, or the like.

In case in which the key data information stored in the second image display apparatus 100b is the same as the key data stored in the memory 140, the network interface 135 or external device interface 130 of the image display apparatus 100 may perform pairing with the image display apparatus 100b and complete the pairing. In this case, the wireless pairing may be WiFi-based wireless pairing.

FIG. 11A illustrates that wireless pairing between the image display apparatus 100 located in the first space RM1 and the second image display apparatus 100b located in the second space RM2 has been performed and completed.

The signal processing device 170 of the image display apparatus 100 may perform control so that an object 1127 for displaying the mirroring image is displayed after wireless pairing with the second image display apparatus 100b is completed.

The drawing illustrates that a mirroring item is included in the object 1127.

Meanwhile, after the completing pairing with the second image display apparatus 100b, in case in which the mirroring input with the second image display apparatus 100b is received according to the selection of the mirroring item in the object 1127, the signal processing device 170 may perform control to receive the mirroring image from the second image display apparatus 100b or transmit the displayed image to the second image display apparatus 100b.

In particular, in case in which the mirroring input from the second image display apparatus 100b is received, the signal processing device 170 may receive the mirroring image from the second image display apparatus 100b.

To this end, the network interface 135 or external device interface 130 may transmit a mirroring image request to the second image display apparatus 100b and receive a mirroring image in response.

In response to the mirroring image being received from the second image display apparatus 100b, the signal processing device 170 may be configured to display the received mirroring image on the display 180.

Figure 11E:
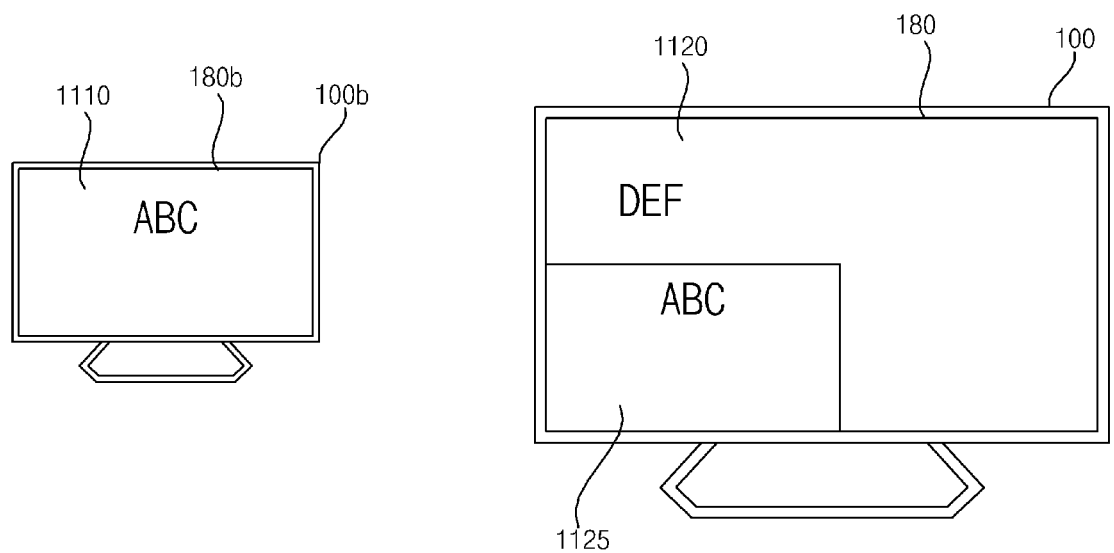

Meanwhile, in case in which the mirroring input from the second image display apparatus 100b is received during displaying the first image 1120 on the display 180, the signal processing device 170 may be configured to display the first image 1120 and the mirroring image 1125 together, as illustrated in FIG. 11E.

Figure 11F:
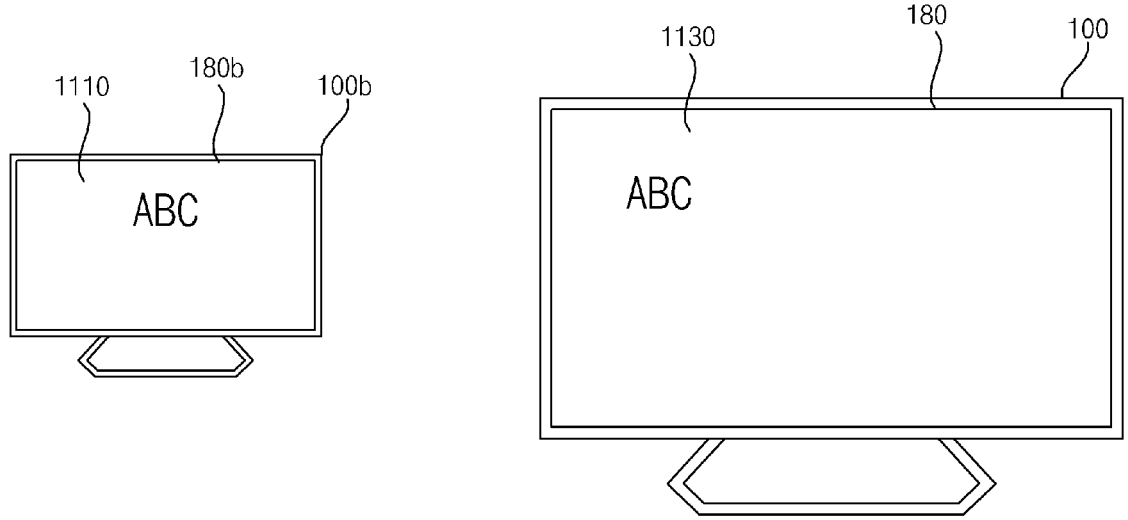

Alternatively, in case in which the mirroring input from the second image display apparatus 100b is received during displaying the first image 1120 on the display 180, the signal processing device 170, may be configured to make the first image 1120 disappear and display only the mirroring image 1125, as illustrated in FIG. 11F.

Figure 12:
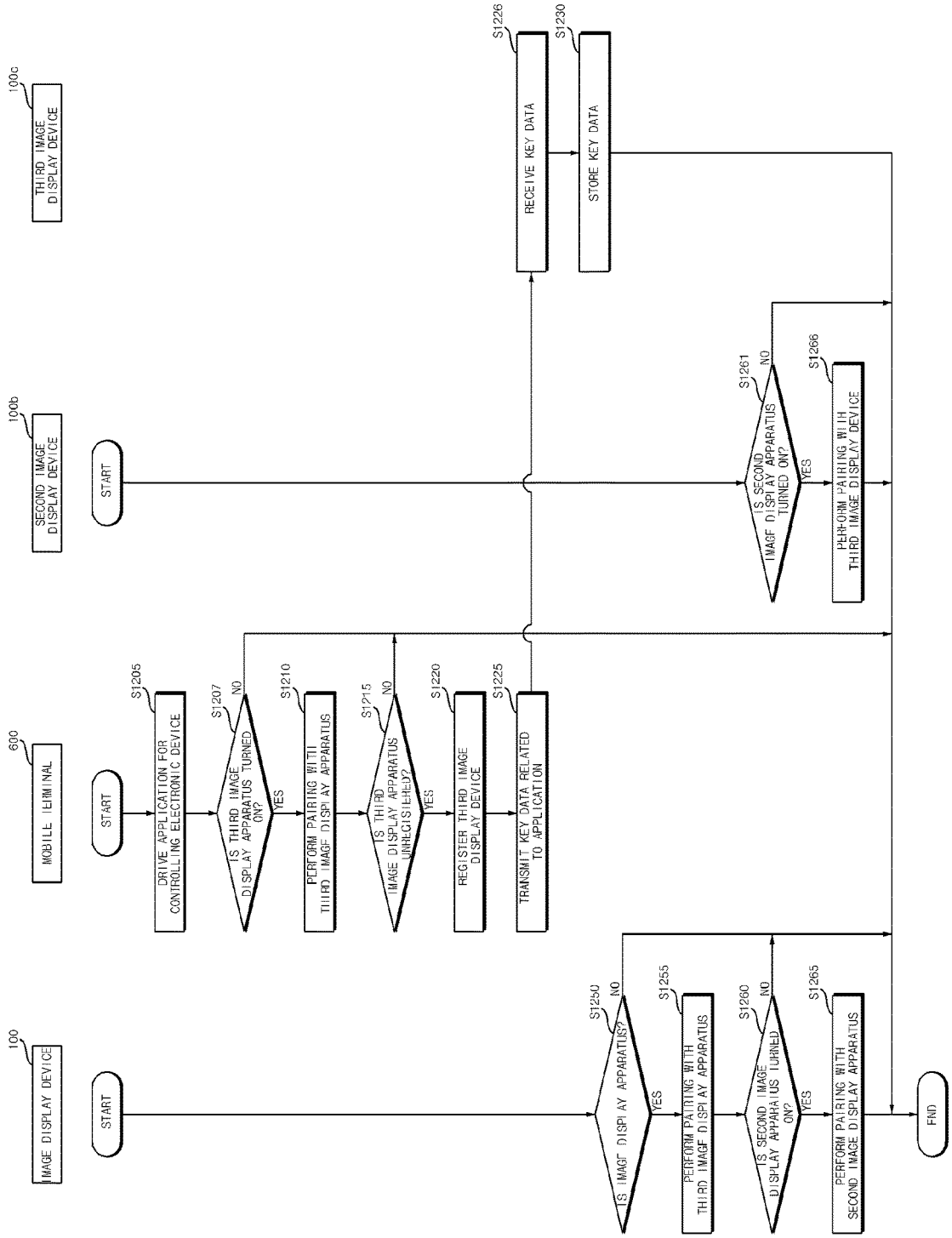
FIG. 12 is a flowchart illustrating an example of an operation method of an image display system according to another embodiment of the present disclosure.

FIG. 12 is a flowchart illustrating an example of an operation method of an image display system according to another embodiment of the present disclosure.

Referring to the drawing, the mobile terminal 600 executes the application for controlling the electronic device based on user input or the like (S1205).

For example, the application screen 900 for controlling the electronic device may be displayed on the display 680, as illustrated in FIG. 9B.

Meanwhile, the mobile terminal 600 determines whether the third image display apparatus 100c among the surrounding electronic devices is turned on (S1207), and in case in which the third image display apparatus 100c is turned on, the mobile terminal 600 may perform pairing with the third image display apparatus 100c (S1210).

For example, in case in which the third image display apparatus 100c is turned on, the mobile terminal 600 may transmit the pairing request signal to the third image display apparatus 100c and receive the pairing response signal from the third image display apparatus 100c. Accordingly, the pairing may be performed.

As another example, in case in which the third image display apparatus 100c is turned on, the third image display apparatus 100c may transmit the pairing request signal to the mobile terminal 600 and receive the pairing response signal from the mobile terminal 600. Accordingly, the pairing may be performed.

Meanwhile, the mobile terminal 600 may display information indicating that the third image display apparatus 100c is turned on after pairing with the third image display apparatus 100c.

Meanwhile, the mobile terminal 600 may receive information about the third image display apparatus 100c through wireless pairing. For example, the mobile terminal 600 may receive device information, product number information, or the like of the third image display apparatus 100c.

Meanwhile, the mobile terminal 600 may determine whether the third image display apparatus 100c is unregistered based on the received information about the third image display apparatus 100c (S1215).

Additionally, the mobile terminal 600 may be configured to perform the product registration in case in which the third image display apparatus 100c is unregistered (S1225).

For example, the mobile terminal 600 may be connected to the server (not illustrated) of an electronic device manufacturer, transmit the device information, the product number information, or the like of the third image display apparatus 100c to the server (not illustrated), and may be configured to register the third image display apparatus 100c in the server (not illustrated).

As another example, the mobile terminal 600 may be configured to register device information, product number information, or the like of the third image display apparatus 100c in the application for controlling the electronic device.

The mobile terminal 600 may transmit the key data related to the application for controlling the electronic device to the third image display apparatus 100c after registration of the third image display apparatus 100*c* or based on the user input, or the like (S1225).

Accordingly, a network interface 135*c* or an external device interface 130*c* of the third image display apparatus 100*c* may receive the key data (S1226) and store the key data in the memory 140*b* (S1230).

Next, in case in which the image display apparatus 100 is turned on (S1250), the image display apparatus 100 can perform the wireless pairing with the mobile terminal 600.

Moreover, the network interface 135 or external device interface 130 of the image display apparatus 100 may receive information about the third image display apparatus 100*c* after completing the wireless pairing with the mobile terminal 600.

The information about the third image display apparatus 100*c* may include the key data information stored in the third image display apparatus 100*c* and the wireless network information of the third image display apparatus 100*c*.

In case in which the key data stored in the memory 140 is the same as the key data stored in the third image display apparatus 100*c*, the network interface 135 or external device interface 130 of the image display apparatus 100 displays the third image display apparatus 100*c* may perform wireless pairing with the third image display apparatus 100*c*.

Meanwhile, in case in which the second image display apparatus 100*b* is turned on (S1260), the image display apparatus 100 may perform the wireless pairing with the second image display apparatus 100*b* (S1265).

For example, in case in which the key data stored in the memory 140 is the same as the key data stored in the second image display apparatus 100*b* based on information about the second image display apparatus 100*c*, the network interface 135 or external device interface 130 of the image display apparatus 100 may perform the wireless pairing with the second image display apparatus 100*b*.

Meanwhile, in case in which the second image display apparatus 100*b* is turned on (S1261), the second image display apparatus 100*b* may perform the wireless pairing with the mobile terminal 600.

Moreover, the network interface 130*b* or external device interface 135*b* of the second image display apparatus 100*b* may receive information about the third image display apparatus 100*c* after completing the wireless pairing with the mobile terminal 600.

The information about the third image display apparatus 100*c* may include key data information stored in the third image display apparatus 100*c* and wireless network information of the third image display apparatus 100*c*.

In case in which the key data stored in the memory 140*b* is the same as the key data stored in the third image display apparatus 100*c*, the network interface 135*b* or external device interface 130*b* of the second image display apparatus 100*b* may perform wireless pairing with the image display apparatus 100*c*.

As a result, the image display apparatus 100, the second image display apparatus 100*b*, and the third image display apparatus 100*c* may each be wirelessly paired with each other.

Figure 13A:
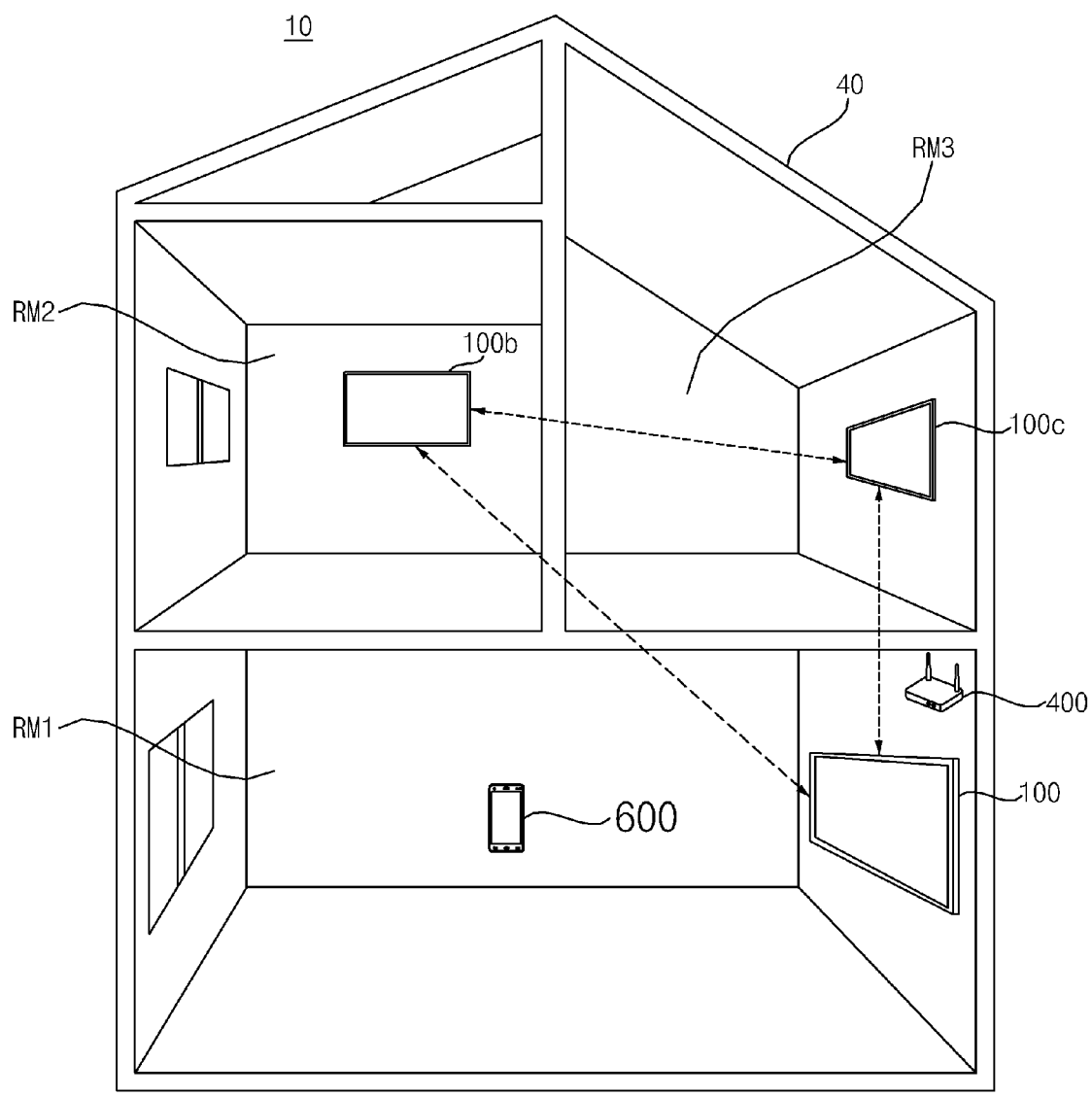
FIGS. 13A to 13E are diagrams referenced in the description of the operation method of FIG. 12.

FIG. 13A illustrates that the image display apparatus 100 located in the first space RM1 in the building 40, the second image display apparatus 100*b* located in the second space RM2, and the third image display apparatus 100*c* located in the third space RM3 are wirelessly paired with each other.

Figure 13B:
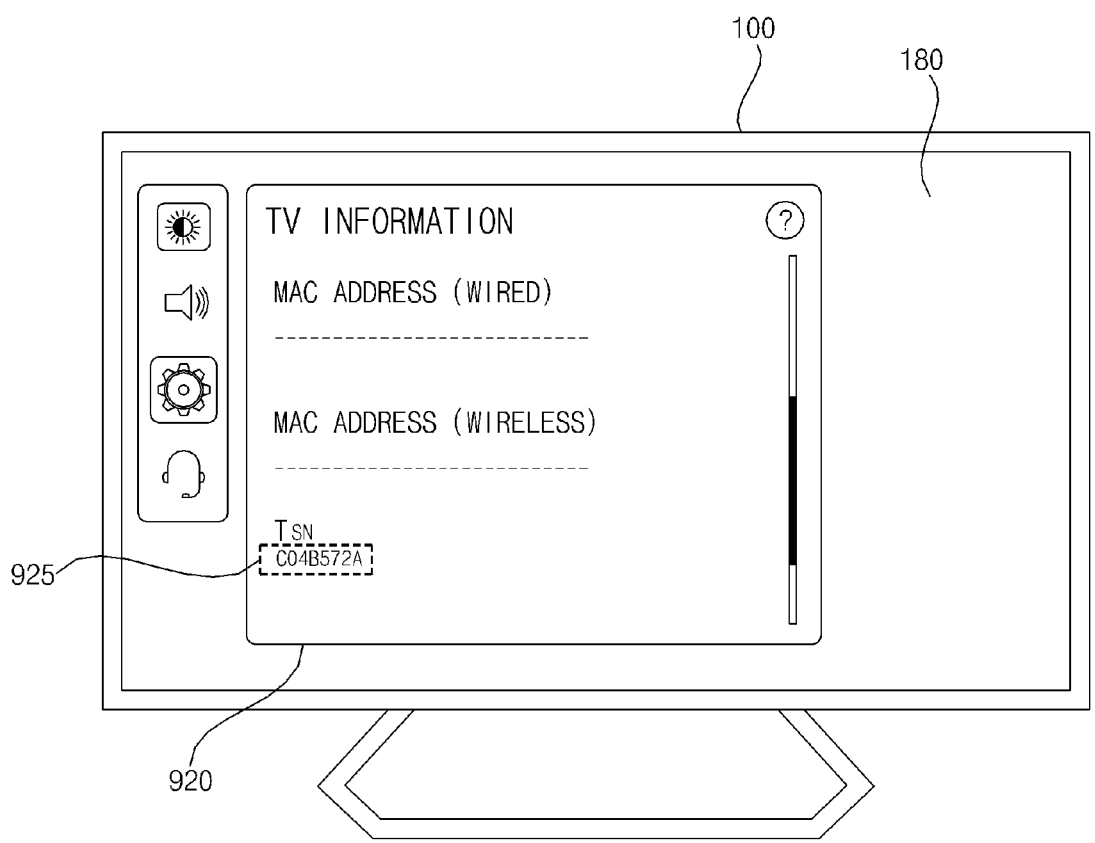

FIG. 13B illustrates that key data 925 is displayed on the setting screen 920 displayed on the display 180 of the image display apparatus 100.

Figure 13C:
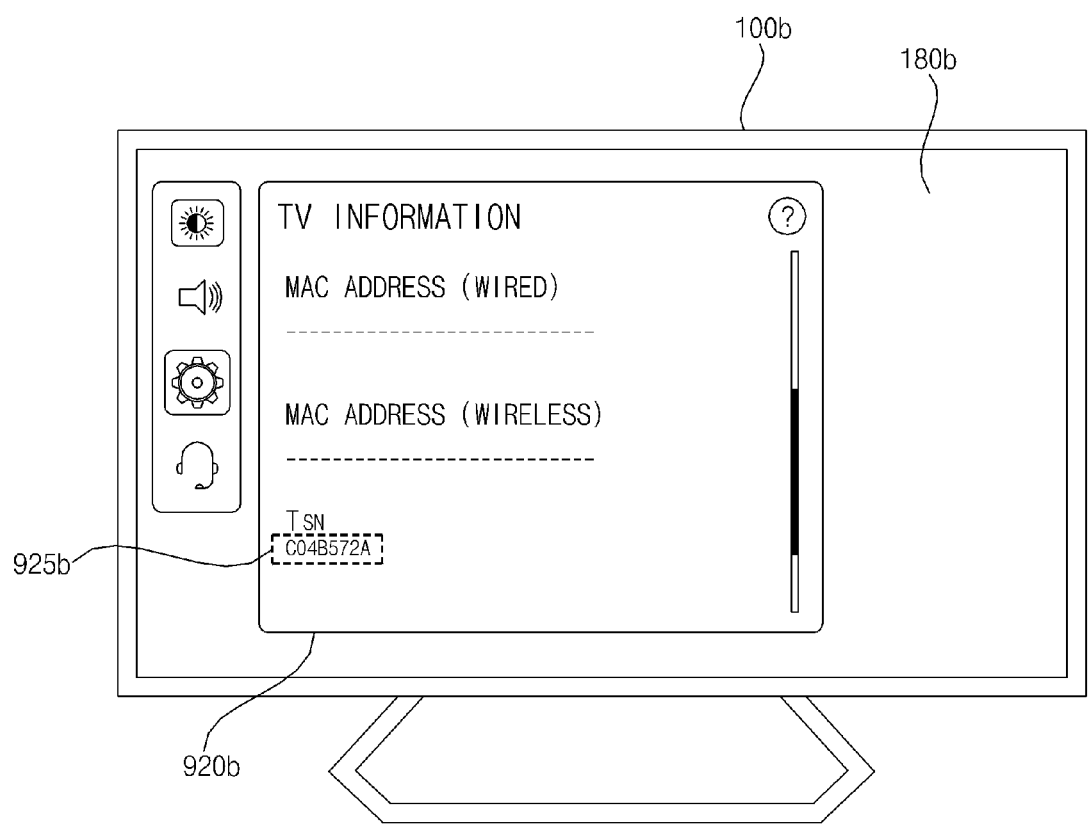

FIG. 13C illustrates that key data 925*b* is displayed on a setting screen 920*b* displayed on the display 180*b* of the second image display apparatus 100*b*.

Figure 13D:
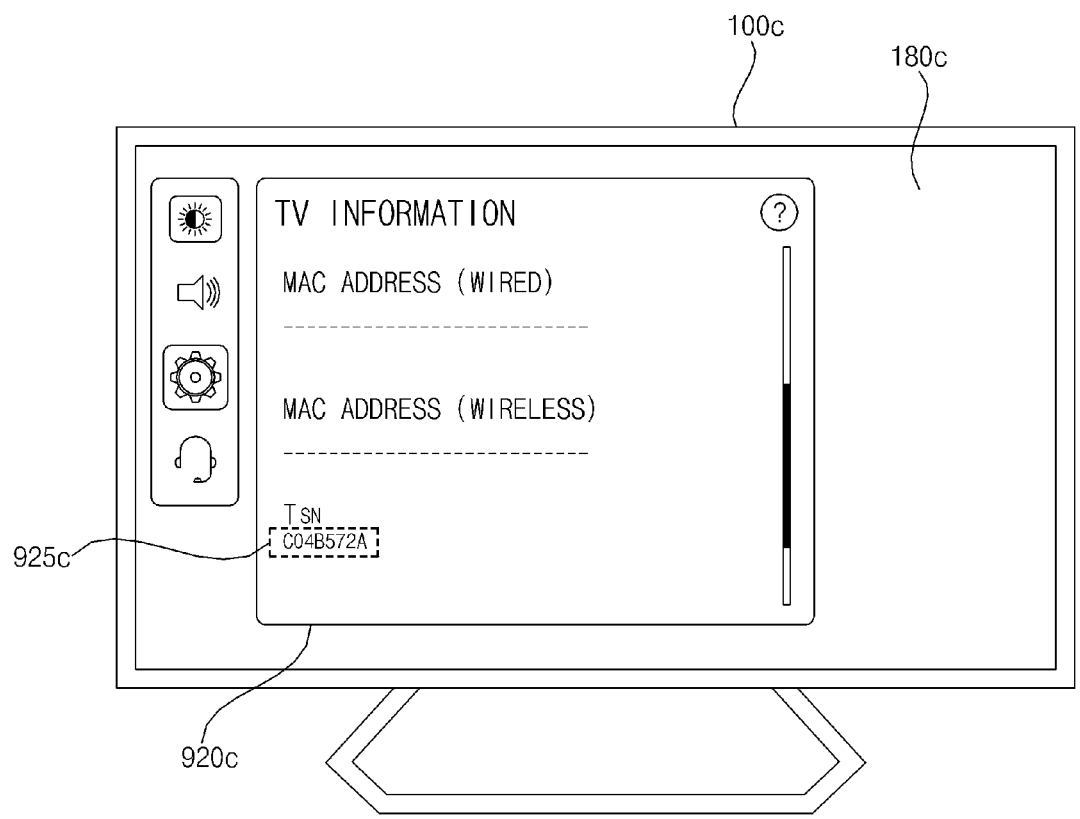

FIG. 13D illustrates that key data 925*c* is displayed on a setting screen 920*c* displayed on the display 180*c* of the third image display apparatus 100*c*.

Referring to FIGS. 13*b* to 13*d*, it can be seen that all key data are the same. Accordingly, the image display apparatus 100, the second image display apparatus 100*b*, and the third image display apparatus 100*c* may each be wirelessly paired with each other.

The network interface 135 or external device interface 130 of the image display apparatus 100 may receive data related to the third image display apparatus 100*c* from the mobile terminal 600, and the signal processing device 170 may perform control to receive the second mirroring image from the third image display apparatus 100*c* or transmit the displayed image to the third image display apparatus 100*c* in case in which the mirroring input from the third image display apparatus 100*c* is received and display the received second mirroring image on the display 180 in case in which the second mirroring image is received from the third image display apparatus 100*c*.

In particular, in case in which the second mirroring image is received from the third image display apparatus 100*c* in a state where the mirroring image is received from the second image display apparatus 100*b*, the signal processing device 170 of the image display apparatus 100 may be configured to display the mirroring image with the second mirroring image together.

Figure 13E:
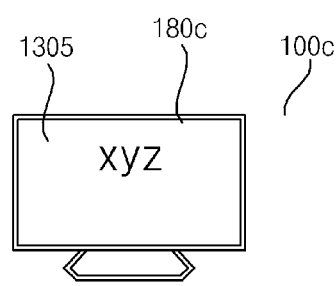
Figure 13E:
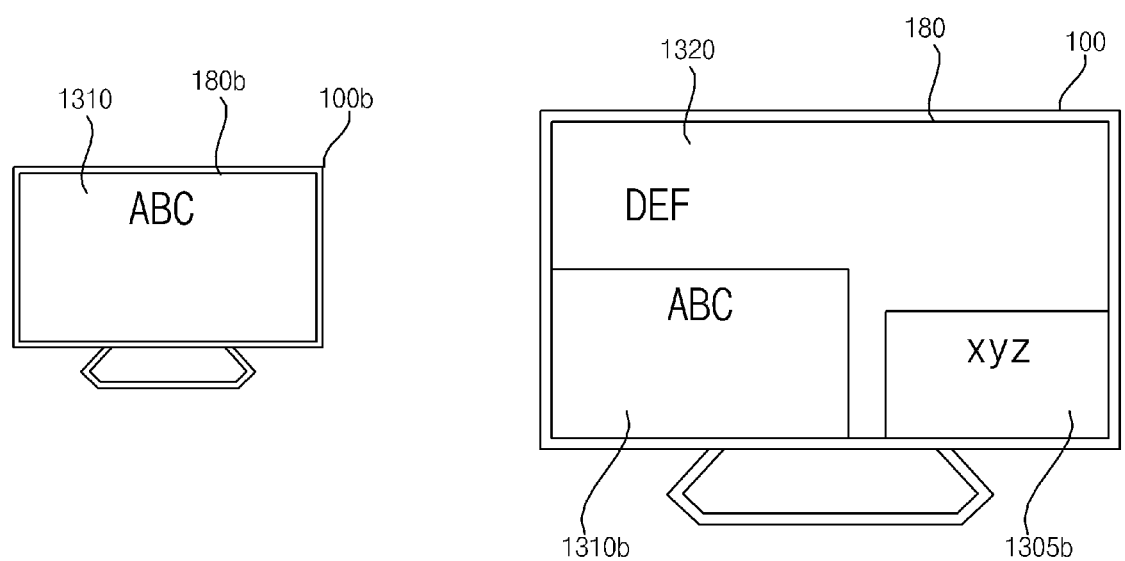

FIG. 13E illustrates that each mirroring image received by the image display apparatus 100 in a state where the second image 1310 is displayed in the second image display apparatus 100*b* and the third image 1305 is displayed in the third image display apparatus 100*c* and a first mirroring image 1310*b* corresponding to the second image 1310 and a second mirroring image 1305*b* corresponding to the third image 1305 are displayed together.

In particular, the drawing illustrates that the first mirroring image 1310*b* and the second mirroring image 1305*b* are displayed together with the displayed first image 1320. Accordingly, it is possible to easily display the mirroring image.

Figure 14:
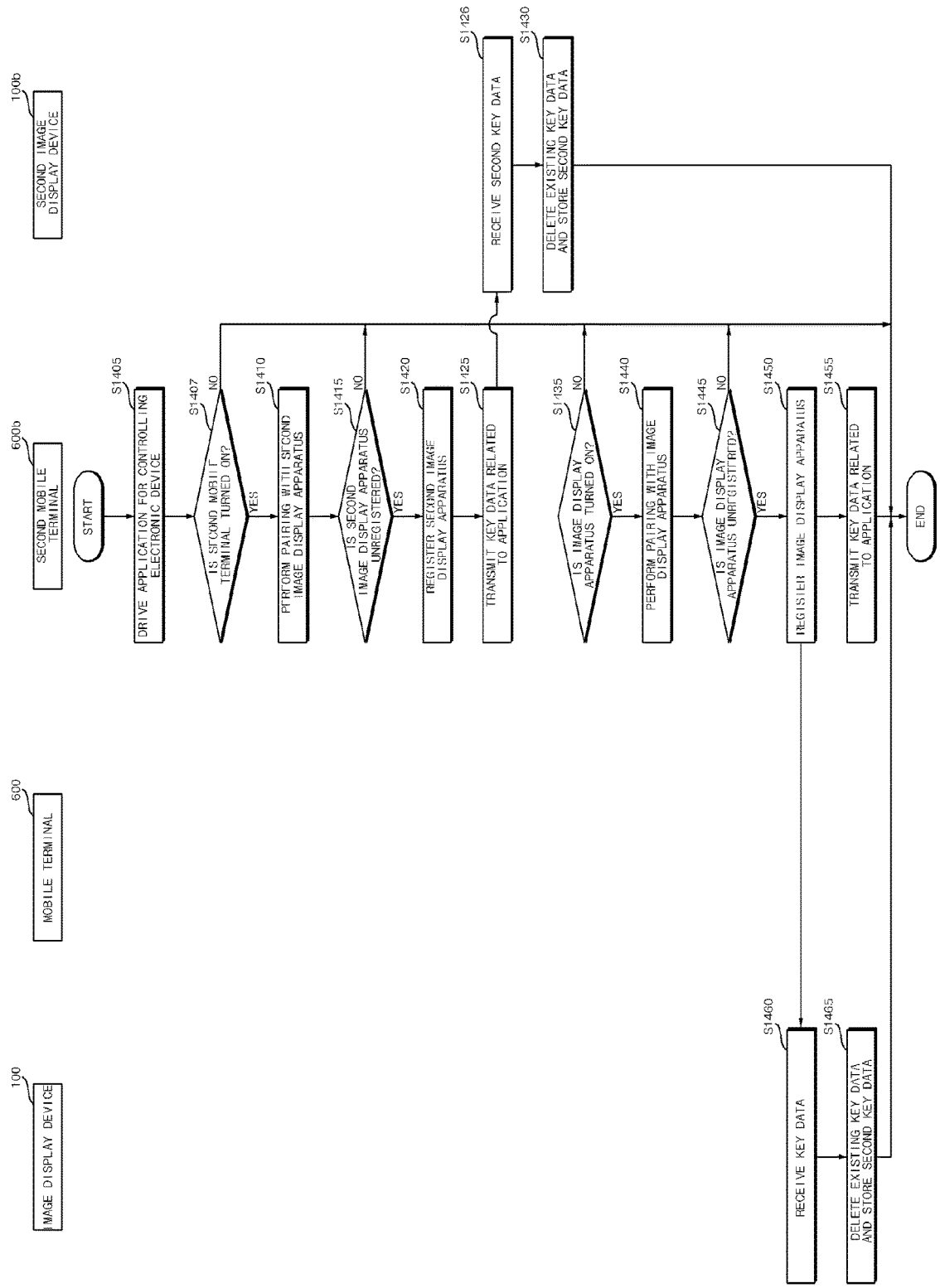
FIG. 14 is a flowchart illustrating an example of an operation method of an image display system according to still another embodiment of the present disclosure.

FIG. 14 is a flowchart illustrating an example of an operation method of an image display system according to another embodiment of the present disclosure.

Referring to the drawing, the second mobile terminal 600*b* executes the application for controlling the electronic device based on the user input, or the like (S1405).

Figure 16A:
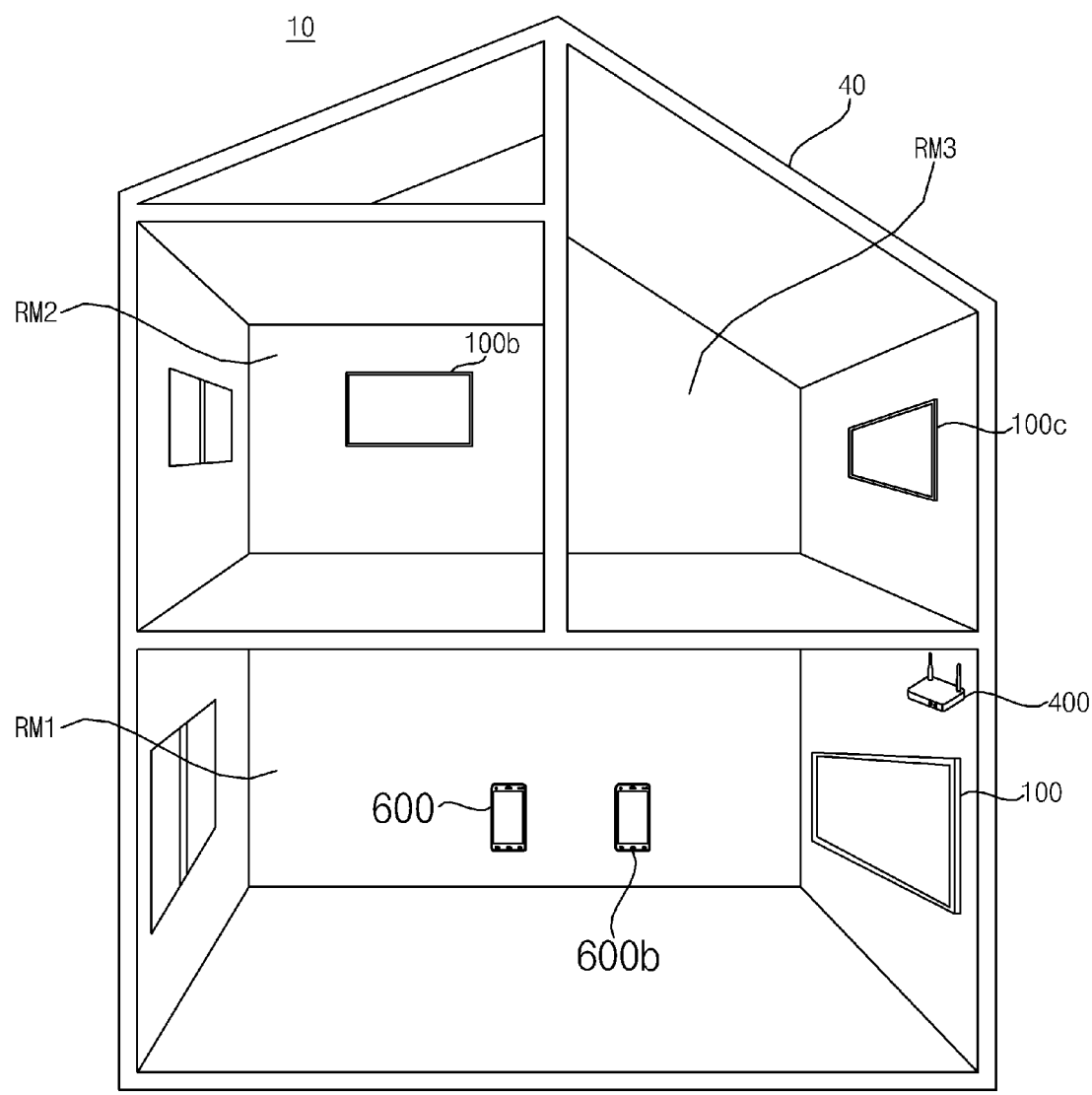
FIGS. 16A to 16D are diagrams referenced in the description of the operation method of FIG. 14 or FIG. 15.
Figure 16B:
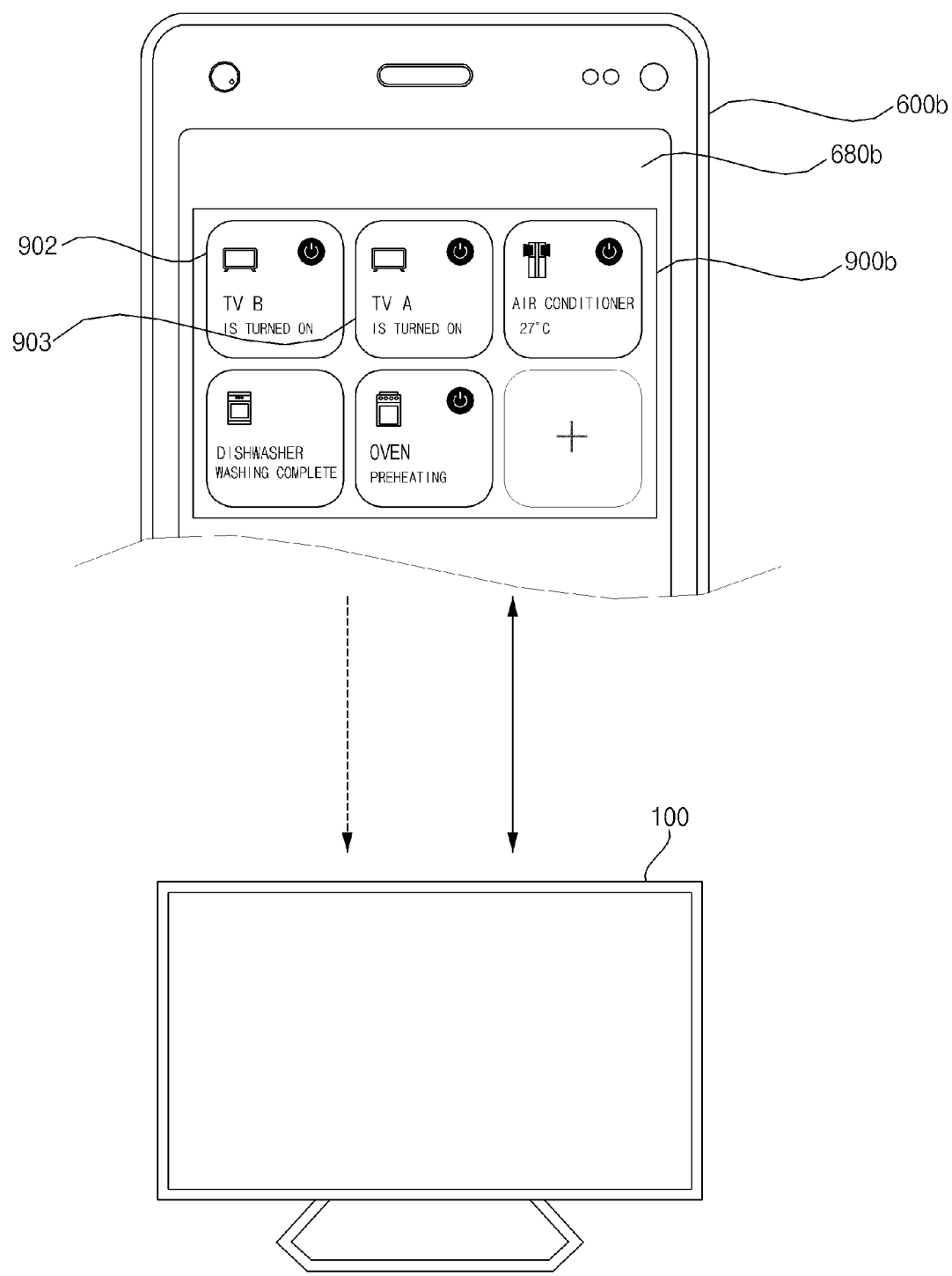

For example, as illustrated in FIG. 16B, the application screen 900*b* for controlling the electronic device may be displayed on the display 680*b*.

The application screen 900*b* for controlling an electronic device may include items for controlling a plurality of electronic devices, and FIG. 16*b* illustrates that the application screen 900 for controlling the electronic device includes the TV item 903, the TV B item 902, the air conditioner item, the oven item, the dishwasher item, or the like.

Meanwhile, the second mobile terminal 600*b* determines whether the second image display apparatus 100*b* among the surrounding electronic devices is turned on (S1407), and in case in which the second image display apparatus 100*b* is turned on, the second mobile terminal 600*b* may perform pairing with the second image display apparatus 100*b* (S1410).

For example, in case in which the second image display apparatus 100b is turned on, the second mobile terminal 600b may transmit the pairing request signal to the second image display apparatus 100b, and receive the pairing response signal from the second image display apparatus 100b. Accordingly, the pairing may be performed.

As another example, in case in which the second image display apparatus 100b is turned on, the second image display apparatus 100b may transmit the pairing request signal to the second mobile terminal 600b and receive the pairing response signal from the second mobile terminal 600b. Accordingly, the pairing may be performed.

Meanwhile, the second mobile terminal 600b may display information indicating that the second image display apparatus is turned on after the pairing with the second image display apparatus 100b. In relation to this, FIG. 16B illustrates that the information indicating that the second image display apparatus 100b is turned on is displayed in the TV B item 902.

Meanwhile, in case in which the image display apparatus 100 is turned on and the wireless pairing is performed, the second mobile terminal 600b may display on-information of the image display apparatus 100 in the TV item, as illustrated in FIG. 16B.

Meanwhile, the second mobile terminal 600b may receive information about the second image display apparatus 100b through the wireless pairing. For example, the second mobile terminal 600b may receive the device information, product number information, or the like of the second image display apparatus 100b.

The second mobile terminal 600b may determine whether the second image display apparatus is unregistered based on the received information about the second image display apparatus 100b (S1415).

Moreover, the second mobile terminal 600b may be configured to perform product registration in case in which the second image display apparatus 100b is unregistered (S1425).

For example, the second mobile terminal 600b may be connected to the server (not illustrated) of an electronic device manufacturer, transmit the device information, the product number information, or the like of the second image display apparatus 100b to the server (not illustrated), and may be configured to register the second image display apparatus 100b in the server (not illustrated).

As another example, the second mobile terminal 600b may be configured to register the device information, the product number information, or the like of the second image display apparatus in the application for controlling the electronic device.

The second mobile terminal 600b may transmit the key data related to the application for controlling the electronic device to the second image display apparatus 100b after registration of the second image display apparatus 100b or based on the user input, or the like (S1425).

Accordingly, the network interface 135c or the external device interface 130c of the second image display apparatus 100b may receive the second key data (S1426) and store the second key data in the memory 140b (S1430).

Next, the second mobile terminal 600b determines whether the image display apparatus 100 among the surrounding electronic devices is turned on (S1435), and in case in which the image display apparatus 100 is turned on, the second mobile terminal 600b may perform the pairing with the image display apparatus 100 (S1440).

For example, in case in which the image display apparatus 100 is turned on, the second mobile terminal 600b may transmit the pairing request signal to the image display apparatus 100 and receive the pairing response signal from the image display apparatus 100. Accordingly, the pairing may be performed.

As another example, in case in which the image display apparatus 100 is turned on, the image display apparatus 100 may transmit the pairing request signal to the second mobile terminal 600b and receive the pairing response signal from the second mobile terminal 600b. Accordingly, the pairing may be performed.

The second mobile terminal 600b may receive information about the image display apparatus 100 through the wireless pairing. For example, the second mobile terminal 600b may receive the device information, the product number information, or the like of the image display apparatus 100.

The second mobile terminal 600b may determine whether the image display apparatus 100 is unregistered based on the received information about the image display apparatus 100 (S1445).

Additionally, the second mobile terminal 600b may be configured to perform the product registration in case in which the image display apparatus 100 is unregistered (S1450).

For example, the second mobile terminal 600b may be connected to the server (not illustrated) of an electronic device manufacturer, transmit the device information, the product number information, or the like of the image display apparatus 100 to the server (not illustrated), and may be configured to register the image display apparatus 100 in the server (not illustrated).

As another example, the second mobile terminal 600b may be configured to register the device information, the product number information, or the like of the image display apparatus 100 in the application for controlling the electronic device.

The second mobile terminal 600b may transmit the second key data related to the application for controlling the electronic device to the image display apparatus 100 after registration of the image display apparatus 100 or based on user input, or the like (S1455).

Accordingly, the network interface 135 or external device interface 130 of the image display apparatus 100 may receive the second key data (S1460), and the memory 140 may delete the key data transmitted from the existing mobile terminal 600 and store the second key data received from the second mobile terminal 600b (S1465).

In this way, whenever key data is newly received, the image display apparatus 100 may update the stored key data.

Figure 15:
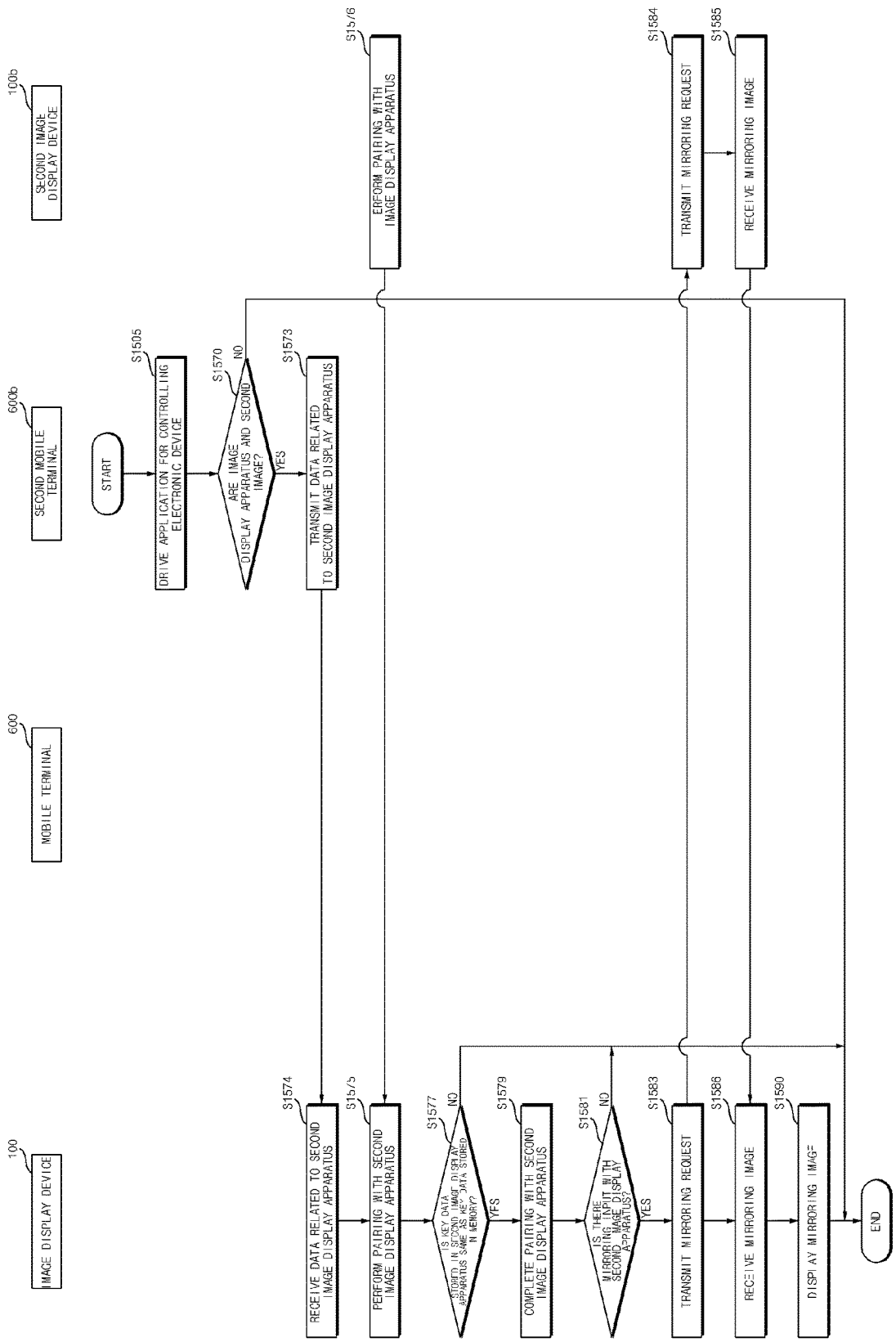
FIG. 15 is a flowchart illustrating another example of an operation method of an image display system according to still another embodiment of the present disclosure.

FIG. 15 is a flowchart illustrating another example of an operation method of an image display system according to another embodiment of the present disclosure, and FIGS. 16A to 16D are diagrams referenced in the description of the operation method of FIG. 14 or FIG. 15.

Referring to FIG. 15, the second mobile terminal 600b executes the application for controlling the electronic device based on user input, or the like (S1505).

For example, as illustrated in FIG. 16B, the application screen 900b for controlling the electronic device may be displayed on the display 680b.

The application screen 900b for controlling electronic devices may include items for controlling a plurality of electronic devices.

The second mobile terminal 600b determines whether both the image display apparatus 100 and the second image display apparatus 100b are turned on (S1570).

For example, in case in which both the image display apparatus 100 and the second image display apparatus 100b are turned on, the second mobile terminal 600b may perform wireless pairing with each of the image display apparatus 100 and the second image display apparatus 100b. In particular, the second mobile terminal 600b may perform multi-pairing with the image display apparatus 100 and the second image display apparatus 100b.

In FIG. 16B, both the image display apparatus 100 and the second image display apparatus 100b are turned on, the information indicating that the image display apparatus 100 is turned on is displayed in the TV item 903, and the information indicating that the second image display apparatus 100b is turned on is displayed in the TV B item 902.

Next, the second mobile terminal 600b may transmit data related to the second image display apparatus 100b to the image display apparatus 100 based on user input, or the like (S873).

The data related to the second image display apparatus 100b may include key data information stored in the second image display apparatus 100b, wireless network information of the second image display apparatus 100b, or the like.

Next, the network interface 135 or external device interface 130 of the image display apparatus 100 may receive the data related to the second image display apparatus 100b from the second mobile terminal 600b (S1574).

In particular, the network interface 135 or external device interface 130 of the image display apparatus 100 may receive the key data information stored in the second image display apparatus 100b, the wireless network information of the second image display apparatus 100b, or the like.

Next, the network interface 135 or external device interface 130 of the image display apparatus 100 may perform pairing with the second image display apparatus 100b based on the received data related to the second image display apparatus 100b (S1575).

For example, the network interface 135 or external device interface 130 of the image display apparatus 100 may transmit the pairing request signal including a plurality of pieces of frequency channel information to the second image display apparatus 100b, and may receive the pairing response signal including frequency channel information selected from the second image display apparatus 100b.

Meanwhile, it is determined whether the key data stored in the second image display apparatus 100b is the same as the key data stored in the memory of the image display apparatus 100 (S1577), and if it is the same, the network interface 135 or external device interface 130 of the image display apparatus 100 completes the pairing with the second image display apparatus 100b (S1579).

In particular, in case in which the key data stored in the second image display apparatus 100b is the same as the key data stored in the memory 140, the signal processing device 170 of the image display apparatus 100 may be configured to complete pairing with the second image display apparatus 100b.

In case in which the key data stored in the second image display apparatus 100b is not the same as the key data stored in the memory of the image display apparatus 100, the network interface 135 or external device interface 135 of the image display apparatus 100 may stop the pairing with the second image display apparatus 100b.

Next, the signal processing device 170 determines whether there is mirroring input with the second image display apparatus 100b (S1581), and in case in which the mirroring input is received, the network interface 135 or external device interface 130 of the image display apparatus 100 may receive the mirroring image from the second image display apparatus 100b or transmit the displayed image to the second image display apparatus 100b.

For example, in case in which the mirroring input is received, the network interface 135 or external device interface 130 of the image display apparatus 100 transmits the mirroring request to the second image display apparatus 100b (S1583), the second image display apparatus 100b receives the mirroring request (S1584) and transmits the mirroring image in response to the mirroring request (S1585).

Accordingly, the network interface 135 or external device interface 130 of the image display apparatus 100 receives the mirroring image, the signal processing device 170 performs signal processing such as scaling on the received image, and is configured to display the signal-processed mirroring image on the display 180 (S1590).

Accordingly, the mirroring can be easily performed between the plurality of image display apparatuses 100 and 100b. In particular, the mirroring can be easily performed between the plurality of image display apparatuses 100 and 100b using the application of the second mobile terminal 600b.

FIG. 16B is a diagram illustrating that the application screen 900b in which the application for controlling the electronic device is executed is displayed on the display 680b of the second mobile terminal 600b.

The application screen 900b may include the TV item 903, the TV B item 902, the air conditioner item, the oven item, and the dishwasher item.

In particular, since the image display apparatus 100 and the second image display apparatus 100b are turned on, information indicating that the image display apparatus 100 and the second image display apparatus 100b are turned on may be displayed in the TV item 903 and TV B item 902.

Figure 16C:
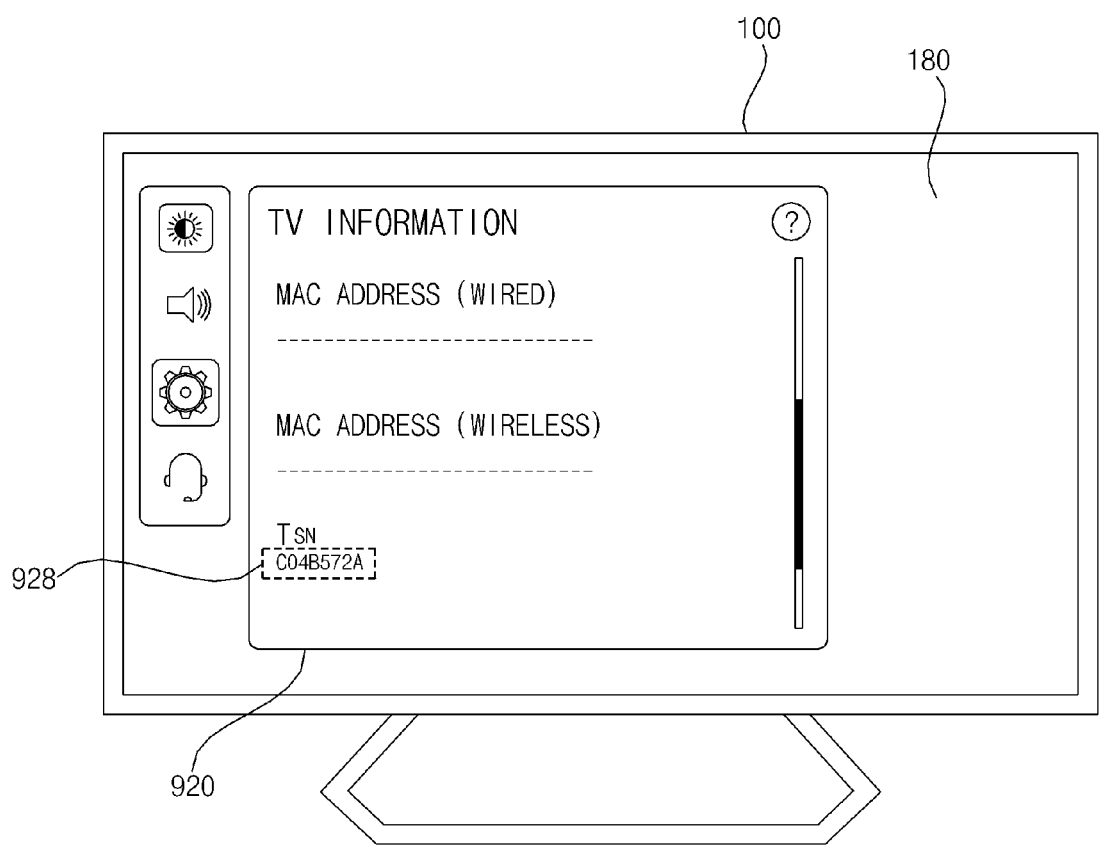

FIG. 16C illustrates that the setting screen 920 is displayed on the display 180 of the image display apparatus 100.

In particular, the image display apparatus 100 receives the key data from the mobile terminal 600 and displays key data information 928.

Figure 16D:
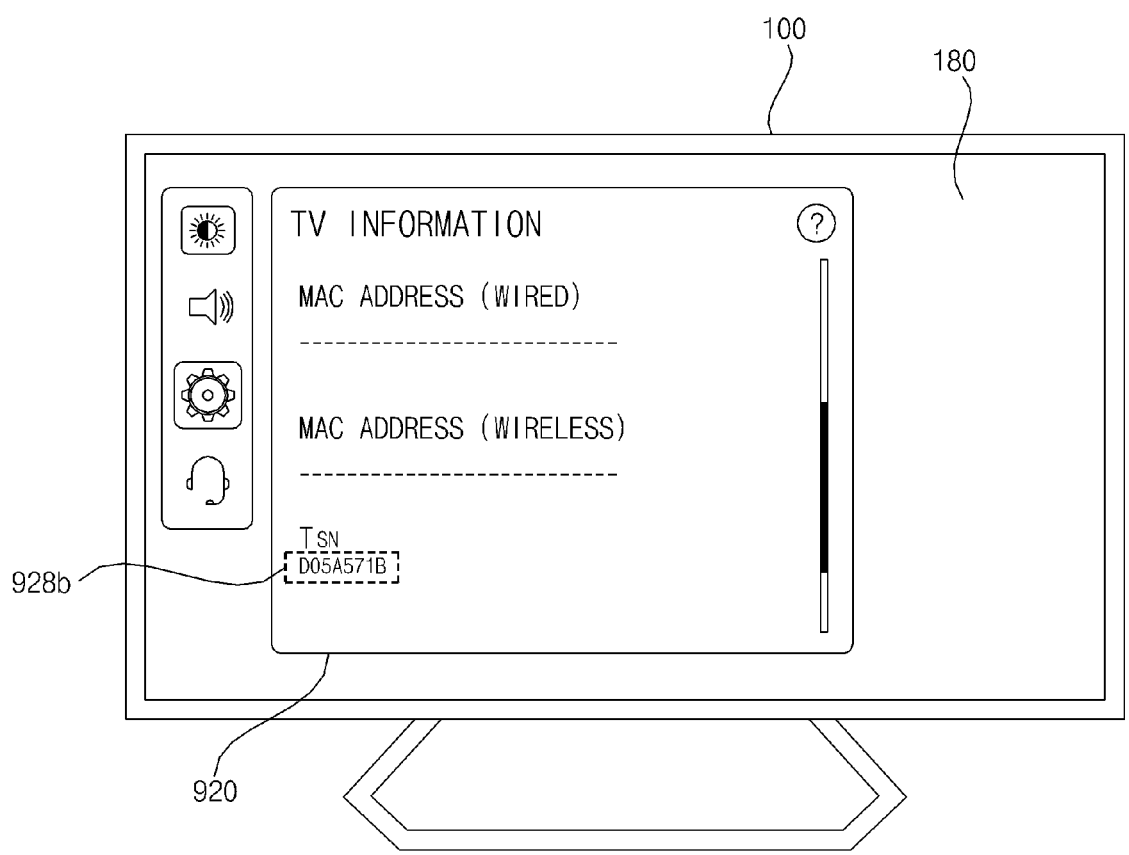

FIG. 16D illustrates that the setting screen 920 is displayed on the display 180 of the image display apparatus 100.

In particular, FIG. 16D illustrates that the image display apparatus 100 receives the second key data from the second mobile terminal 600b, the existing key data information 928 is deleted, and new second key data information 928b is displayed.

In this way, whenever the key data is newly received, the image display apparatus 100 can update the stored key data.

Meanwhile, the wireless pairing can be performed only in case in which the same key data is stored between the plurality of image display apparatuses, and in case in which different key data is stored between the plurality of image display apparatuses, wireless pairing cannot be performed, or the mirroring cannot be performed even in case in which the wireless pairing is performed.

In addition, although preferred embodiments of the present disclosure have been illustrated and described above, the present disclosure is not limited to the specific embodiments described above, various modifications can be made by those skilled in the art to which the invention pertains without departing from the gist of the present disclosure claimed in claims, and these modified embodiments should not be individually understood from the technical idea or perspective of the present disclosure.

What is claimed is:

1. An image display apparatus comprising:
a display;
a signal processing device configured to output an image signal to the display;
an interface configured to receive key data received from a mobile terminal; and
a memory configured to store the key data,
wherein the interface receives data related to a second image display apparatus from the mobile terminal,
wherein in response to a mirroring input with the second image display apparatus being received, the signal processing device is configured to receive a mirroring image from the second image display apparatus or transmit a displayed image to the second image display apparatus,
wherein in response to the mirroring image being received from the second image display apparatus, the signal processing device is configured to display the received mirroring image on the display, and
wherein in response to the second image display apparatus being turned on after data related to the second image display apparatus is received from the mobile terminal, the interface performs pairing with the second image display apparatus.

2. The image display apparatus of claim 1, wherein in response to key data stored in the second image display apparatus being same as the key data stored in the memory, the signal processing device is configured to complete pairing with the second image display apparatus.

3. The image display apparatus of claim 2, wherein a communication method for the pairing is different from a communication method for receiving the mirroring image.

4. The image display apparatus of claim 2, wherein in response to second key data being received from a second mobile terminal via the interface, the memory is configured to delete the key data and store the second key data.

5. The image display apparatus of claim 2, wherein in response to the mirroring input with the second image display apparatus being received after the pairing with the second image display apparatus is completed, the interface receives the mirroring image from the second image display apparatus or transmits the displayed image to the second image display apparatus, and
wherein in response to the mirroring image being received from the second image display apparatus, the signal processing device is configured to display the received mirroring image on the display.

6. The image display apparatus of claim 2, wherein in response to a setting screen display input after key data received from the mobile terminal is received, the signal processing device is configured to display a setting screen including the key data, and
wherein in response to a setting screen display input after second key data received from a second mobile terminal is received, the signal processing device is configured to display a setting screen including the second key data.

7. The image display apparatus of claim 1, wherein in response to an application for controlling an electronic device being executed in the mobile terminal, the key data is received from the mobile terminal.

8. The image display apparatus of claim 1, wherein in response to the second image display apparatus being turned on in a state where an application for controlling an electronic device is executed in the mobile terminal, pairing between the mobile terminal and the second image display apparatus is performed,
after the pairing between the mobile terminal and the second image display apparatus is performed, key data related to the application is transmitted from the mobile terminal to the second image display apparatus,
in response to the image display apparatus being turned on in a state where the application for controlling the electronic device is executed in the mobile terminal, pairing between the mobile terminal and the image display apparatus is performed, and
after the pairing between the mobile terminal and the image display apparatus is performed, the interface receives the key data related to the application from the image display apparatus.

9. The image display apparatus of claim 1, wherein in response to key data stored in the second image display apparatus being same as key data stored in the memory during performing the pairing with the second image display apparatus, the interface completes the pairing with the second image display apparatus, and
in response to the key data stored in the second image display apparatus being not the same as the key data stored in the memory, the interface stops the pairing with the second image display apparatus.

10. The image display apparatus of claim 1, wherein the signal processing device is configured to display a setting screen including the key data according to a setting screen display input.

11. The image display apparatus of claim 1, wherein in response to a mirroring input with the second image display apparatus being received during displaying a first image on the display, the signal processing device is configured to display the first image and the mirroring image together.

12. The image display apparatus of claim 1, wherein in response to the mirroring input with the second image display apparatus being received during displaying a first image on the display, the signal processing device is configured to make the first image disappear and display only the mirroring image.

13. The image display apparatus of claim 1, wherein the interface receives data related to a third image display apparatus from the mobile terminal, and receives a second mirroring image from the third image display apparatus or transmits a displayed image to the third image display apparatus in response to a mirroring input with the third image display apparatus being received, and
wherein in response to the second mirroring image being received from the third image display apparatus, the signal processing device is configured to display the received second mirroring image on the display.

14. An image display system comprising:
an image display apparatus;
a second image display apparatus spaced apart from the image display apparatus; and
a mobile terminal configured to transmit same key data to each of the image display apparatus and the second image display apparatus in response to the image display apparatus and the second image display apparatus being turned on in a state where an application for controlling the second image display apparatus of the image display apparatus is executed,
wherein the image display apparatus comprises:
a display;
a signal processing device configured to output an image signal to the display;

an interface configured to receive key data received from the mobile terminal; and a memory configured to store the key data, wherein the interface receives data related to the second image display apparatus from the mobile terminal, wherein in response to a mirroring input with the second image display apparatus being received, the signal processing device is configured to receive a mirroring image from the second image display apparatus or transmit a displayed image to the second image display apparatus, and wherein in response to the mirroring image being received from the second image display apparatus, the signal processing device is configured to display the received mirroring image on the display.

15. The image display system of claim 14, wherein the image display apparatus and the second image display apparatus perform pairing in response to the same key data as each other being stored, and wherein in response to the mirroring image being received from the second image display apparatus, the image display apparatus displays the received mirroring image.

16. An image display apparatus comprising:

a display;

a signal processing device configured to output an image signal to the display;

an interface configured to receive key data received from a mobile terminal; and a memory configured to store the key data, wherein the interface receives data related to a second image display apparatus from the mobile terminal, wherein in response to a mirroring input with the second image display apparatus being received, the signal processing device is configured to receive a mirroring image from the second image display apparatus or transmit a displayed image to the second image display apparatus, wherein in response to the mirroring image being received from the second image display apparatus, the signal processing device is configured to display the received mirroring image on the display, wherein the interface receives data related to a third image display apparatus from the mobile terminal, and receives a second mirroring image from the third image display apparatus or transmits a displayed image to the third image display apparatus in response to a mirroring input with the third image display apparatus being received, and wherein in response to the second mirroring image being received from the third image display apparatus, the signal processing device is configured to display the received second mirroring image on the display.

17. The image display apparatus of claim 16, wherein in response to the second mirroring image being received from the third image display apparatus in a state where the mirroring image is received from the second image display apparatus, the signal processing device is configured to display the mirroring image and the second mirroring image together.

18. The image display apparatus of claim 16, wherein in response to key data stored in the third image display apparatus being same as key data stored in the memory in a state of pairing with the second image display apparatus, the interface completes the pairing with the second image display apparatus.

19. The image display apparatus of claim 18, wherein in response to the interface pairing with the second image display apparatus and the third image display apparatus, pairing between the second image display apparatus and the third image display apparatus is performed.

* * * * *